US011848805B2

(12) United States Patent
Zhang et al.

(10) Patent No.: US 11,848,805 B2
(45) Date of Patent: Dec. 19, 2023

(54) GUARD INTERVAL CONFIGURATIONS FOR MULTIPLE LINKS

(71) Applicant: QUALCOMM Incorporated, San Diego, CA (US)

(72) Inventors: Xiaoxia Zhang, San Diego, CA (US); Jun Ma, San Diego, CA (US); Morteza Soltani, San Diego, CA (US); Raviteja Patchava, San Diego, CA (US); Jing Sun, San Diego, CA (US); Iyab Issam Sakhnini, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/407,603

(22) Filed: Aug. 20, 2021

(65) Prior Publication Data

US 2023/0060054 A1     Feb. 23, 2023

(51) Int. Cl.
*H04W 56/00*     (2009.01)
*H04L 27/26*     (2006.01)
*H04W 72/02*     (2009.01)
*H04W 72/0446*   (2023.01)

(52) U.S. Cl.
CPC ......... *H04L 27/2607* (2013.01); *H04W 72/02* (2013.01); *H04W 72/0446* (2013.01)

(58) Field of Classification Search
CPC .............. H04L 27/2607; H04W 72/02; H04W 72/0446
USPC ....................................................... 370/329
See application file for complete search history.

(56) References Cited

U.S. PATENT DOCUMENTS

| 2017/0215198 | A1  | 7/2017 | Chen et al. | |
| 2017/0244586 | A1* | 8/2017 | Yoo | H04L 27/2666 |
| 2019/0013978 | A1  | 1/2019 | Zhou et al. | |
| 2020/0187207 | A1* | 6/2020 | Kang | H04W 72/0453 |

(Continued)

FOREIGN PATENT DOCUMENTS

CN     106105352 A     11/2016

OTHER PUBLICATIONS

"Yasukawa, Base station, user device, transmission timing information sending method and discovery signal transmission method, Nov. 9, 2016" (Year: 2016).*

(Continued)

*Primary Examiner* — Sai Ming Chan
(74) *Attorney, Agent, or Firm* — Holland & Hart LLP

(57) ABSTRACT

Methods, systems, and devices for wireless communication are described to support guard interval (GI) configurations for multiple links. For example, a user equipment (UE) may determine a first GI duration for a first transmission reception point (TRP) and a second GI duration for a second TRP, when the UE is operating in a multi-TRP mode. The UE may determine the GI durations based on a difference in timing between signal reception from the first and second TRPs and may transmit a signal to one or both of the TRPs to indicate the GI durations. Based on the indicated GI durations, the first and second TRPs may transmit signaling to the UE that includes or implements the corresponding GI duration for each TRP. For example, the signaling may include a GI appended at the end of each symbol period that has a GI duration corresponding to the respective TRP.

30 Claims, 17 Drawing Sheets

(56) References Cited

U.S. PATENT DOCUMENTS

2020/0196230 A1* 6/2020 John Wilson et al. ..................... H04W 8/245
2022/0085943 A1* 3/2022 Zhu ....................... H04L 5/0078
2022/0304036 A1* 9/2022 Zhang ................... H04L 5/0048

OTHER PUBLICATIONS

Fujitsu: "Views on TB Processing Over Multi-Slot PUSCH", 3GPP TSG RAN WG1 #104b-e, R1-2102718, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 6, 2021, pp. 1-4, XP051993188, Section 2.2.
International Search Report and Written Opinion—PCT/US2022/073310—ISA/EPO—dated Nov. 7, 2022 (2105914WO).
Nokia., et al., "Beyond 52.6 GHz Study Objectives", 3GPP TSG RAN Meeting #85, RP-192140, 3rd Generation Partnership Project, Mobile Competence Centre, 650, Route Des Lucioles, F-06921 Sophia-Antipolis Cedex, France, vol. TSG RAN, No. Newport Beach, USA, Sep. 16, 2019-Sep. 20, 2019, Sep. 9, 2019, pp. 1-24, XP051782657, p. 6.

\* cited by examiner

GUARD INTERVAL CONFIGURATIONS FOR MULTIPLE LINKS

FIELD OF TECHNOLOGY

The present disclosure relates to wireless communication, including guard interval (GI) configurations for multiple links.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may communicate with multiple transmission reception points (TRPs), where the multiple TRPs may correspond to a same base station, or to different base stations. In some cases, concurrent transmissions from the multiple TRPs may cause interference at the UE.

SUMMARY

The described techniques relate to improved methods, systems, devices, and apparatuses that support guard interval (GI) configurations for multiple links. Generally, the described techniques provide for a user equipment (UE) to determine a first GI duration for a first transmission reception point (TRP) and a second GI duration for a second TRP (e.g., when the UE is operating in a multi-TRP mode). The UE may transmit a signal to one or both of the TRPs to indicate the GI durations. The UE may determine the GI durations based on a difference in timing between signal reception from the first and second TRPs (e.g., a difference in delay spread between TRP and TRP). Based on the indicated GI durations, the first and second TRPs may transmit signaling to the UE that includes or implements the corresponding GI duration for each TRP (e.g., the signaling may include a GI appended at the end of each symbol period that has a GI duration corresponding to the respective TRP).

A method for wireless communication at a UE is described. The method may include transmitting an indication of a first GI duration for downlink signals from a first TRP and a second GI duration for downlink signals from a second TRP, communicating with the first TRP during a first set of multiple symbol periods, each symbol period of the first set of multiple symbol periods including a first portion that includes a first information symbol and a second portion that has the first GI duration and includes at least a part of a GI sequence, and communicating with the second TRP during a second set of multiple symbol periods, each symbol period of the second set of multiple symbol periods including a first portion that includes a second information symbol and a second portion that has the second GI duration and includes at least a part of the GI sequence.

An apparatus for wireless communication at a UE is described. The apparatus may include a processor, memory coupled with the processor, and instructions stored in the memory. The instructions may be executable by the processor to cause the apparatus to transmit an indication of a first GI duration for downlink signals from a first TRP and a second GI duration for downlink signals from a second TRP, communicate with the first TRP during a first set of multiple symbol periods, each symbol period of the first set of multiple symbol periods including a first portion that includes a first information symbol and a second portion that has the first GI duration and includes at least a part of a GI sequence, and communicate with the second TRP during a second set of multiple symbol periods, each symbol period of the second set of multiple symbol periods including a first portion that includes a second information symbol and a second portion that has the second GI duration and includes at least a part of the GI sequence.

Another apparatus for wireless communication at a UE is described. The apparatus may include means for transmitting an indication of a first GI duration for downlink signals from a first TRP and a second GI duration for downlink signals from a second TRP, means for communicating with the first TRP during a first set of multiple symbol periods, each symbol period of the first set of multiple symbol periods including a first portion that includes a first information symbol and a second portion that has the first GI duration and includes at least a part of a GI sequence, and means for communicating with the second TRP during a second set of multiple symbol periods, each symbol period of the second set of multiple symbol periods including a first portion that includes a second information symbol and a second portion that has the second GI duration and includes at least a part of the GI sequence.

A non-transitory computer-readable medium storing code for wireless communication at a UE is described. The code may include instructions executable by a processor to transmit an indication of a first GI duration for downlink signals from a first TRP and a second GI duration for downlink signals from a second TRP, communicate with the first TRP during a first set of multiple symbol periods, each symbol period of the first set of multiple symbol periods including a first portion that includes a first information symbol and a second portion that has the first GI duration and includes at least a part of a GI sequence, and communicate with the second TRP during a second set of multiple symbol periods, each symbol period of the second set of multiple symbol periods including a first portion that includes a second information symbol and a second portion that has the second GI duration and includes at least a part of the GI sequence.

Some examples of the method, apparatuses, and non-transitory computer-readable medium described herein may further include operations, features, means, or instructions for determining the first GI duration and the second GI duration based on a timing difference between signaling from the first TRP and signaling from the second TRP, where transmitting the indication of the first GI duration and the second GI duration may be based on the determining.

In some examples of the method, apparatuses, and non-transitory computer-readable medium described herein, transmitting the indication of the first GI duration and the second GI duration may include operations, features, means, or instructions for transmitting a first indication identifying a first transmission configuration indicator (TCI) state, a first TCI state group, a first control resource set (CORESET) pool index, or any combination thereof, associated with the first TRP and the first GI duration and transmitting a second indication identifying a second TCI state, a second TCI state group, a second CORESET pool index, or any combination thereof, associated with the second TRP and the second GI duration.

Some examples of the method, apparatuses, and non-transitory computer-readable medium described herein may further include operations, features, means, or instructions for performing, within a same time period, a signal processing operation on the first portion of a first symbol period of the first set of multiple symbol periods and on the first portion of a second symbol period of the second set of multiple symbol periods.

Some examples of the method, apparatuses, and non-transitory computer-readable medium described herein may further include operations, features, means, or instructions for identifying a first signal delay for the first TRP and a second signal delay for the second TRP and selecting a same duration for the first GI duration and the second GI duration based on a largest signal delay of the first signal delay and the second signal delay, where the indication of the first GI duration and the second GI duration includes the selected same duration.

In some examples of the method, apparatuses, and non-transitory computer-readable medium described herein, the UE communicates with the first TRP and the second TRP according to a time division multiplexing (TDM) scheme or using a single frequency network (SFN).

Some examples of the method, apparatuses, and non-transitory computer-readable medium described herein may further include operations, features, means, or instructions for transmitting an indication of a time period associated with a capability of the UE to change a GI duration and determining a transport block size (TBS) for the first TRP, the second TRP, or both, according to the time period and based on the first GI duration and the second GI duration.

Some examples of the method, apparatuses, and non-transitory computer-readable medium described herein may further include operations, features, means, or instructions for determining a first quantity of unquantized information bits of a transport block (TB) corresponding to the first TRP and a second quantity of unquantized information bits of a TB corresponding to the second TRP and determining a TBS applicable to the first TRP and the second TRP based on a sum of the first quantity of unquantized information bits and the second quantity of unquantized information bits.

In some examples of the method, apparatuses, and non-transitory computer-readable medium described herein, a first resource block (RB) associated with the first TRP and a second RB associated with the second TRP include a same number of usable time domain resource elements (REs).

In some examples of the method, apparatuses, and non-transitory computer-readable medium described herein, a first transmission layer associated with the first TRP and a second transmission layer associated with the second TRP include a same number of usable time domain REs.

A method for wireless communication at a base station is described. The method may include receiving, from a UE, an indication of a first GI duration for downlink signals from a first TRP and a second GI duration for downlink signals from a second TRP and communicating with the UE via at least the first TRP during a first set of multiple symbol periods, each symbol period of the first set of multiple symbol periods including a first portion that includes a first information symbol and a second portion that has the first GI duration and includes at least a part of a GI sequence.

An apparatus for wireless communication at a base station is described. The apparatus may include a processor, memory coupled with the processor, and instructions stored in the memory. The instructions may be executable by the processor to cause the apparatus to receive, from a UE, an indication of a first GI duration for downlink signals from a first TRP and a second GI duration for downlink signals from a second TRP and communicate with the UE via at least the first TRP during a first set of multiple symbol periods, each symbol period of the first set of multiple symbol periods including a first portion that includes a first information symbol and a second portion that has the first GI duration and includes at least a part of a GI sequence.

Another apparatus for wireless communication at a base station is described. The apparatus may include means for receiving, from a UE, an indication of a first GI duration for downlink signals from a first TRP and a second GI duration for downlink signals from a second TRP and means for communicating with the UE via at least the first TRP during a first set of multiple symbol periods, each symbol period of the first set of multiple symbol periods including a first portion that includes a first information symbol and a second portion that has the first GI duration and includes at least a part of a GI sequence.

A non-transitory computer-readable medium storing code for wireless communication at a base station is described. The code may include instructions executable by a processor to receive, from a UE, an indication of a first GI duration for downlink signals from a first TRP and a second GI duration for downlink signals from a second TRP and communicate with the UE via at least the first TRP during a first set of multiple symbol periods, each symbol period of the first set of multiple symbol periods including a first portion that includes a first information symbol and a second portion that has the first GI duration and includes at least a part of a GI sequence.

Some examples of the method, apparatuses, and non-transitory computer-readable medium described herein may further include operations, features, means, or instructions for communicating with the UE via the second TRP during a second set of multiple symbol periods, each symbol period of the second set of multiple symbol periods including a first portion that includes a second information symbol and a second portion that may have the second GI duration and includes at least a part of the GI sequence.

In some examples of the method, apparatuses, and non-transitory computer-readable medium described herein, the first GI duration and the second GI duration correspond to a timing difference between signaling from the first TRP to the UE and signaling from the second TRP to the UE.

In some examples of the method, apparatuses, and non-transitory computer-readable medium described herein, receiving the indication of the first GI duration and the second GI duration may include operations, features, means, or instructions for receiving a first indication identifying a first TCI state, a first TCI state group, a first CORESET pool index, or any combination thereof, associated with the first TRP and the first GI duration and receiving a second indication identifying a second TCI state or a second CORESET pool index, or any combination thereof, associated with the second TRP and the second GI duration.

In some examples of the method, apparatuses, and non-transitory computer-readable medium described herein, receiving the indication of the first GI duration and the second GI duration may include operations, features, means, or instructions for receiving an indication of a same duration for the first GI duration and the second GI duration, where the same duration for the first GI duration and the second GI duration corresponds to a largest signal delay of a first signal delay for signaling from the first TRP to the UE and a second signal delay for signaling from the second TRP to the UE.

In some examples of the method, apparatuses, and non-transitory computer-readable medium described herein, the communicating with the UE takes place according to a TDM scheme or using a SFN.

Some examples of the method, apparatuses, and non-transitory computer-readable medium described herein may further include operations, features, means, or instructions for receiving an indication of a time period associated with a capability of the UE to change a GI duration and determining a TBS for the first TRP according to the time period and based on the first GI duration and the second GI duration.

Some examples of the method, apparatuses, and non-transitory computer-readable medium described herein may further include operations, features, means, or instructions for determining a first quantity of unquantized information bits of a TB corresponding to the first TRP and a second quantity of unquantized information bits of a TB corresponding to the second TRP and determining a TBS applicable to the first TRP and the second TRP based on a sum of the first quantity of unquantized information bits and the second quantity of unquantized information bits.

In some examples of the method, apparatuses, and non-transitory computer-readable medium described herein, a first RB associated with the first TRP and a second RB associated with the second TRP include a same number of usable time domain REs.

In some examples of the method, apparatuses, and non-transitory computer-readable medium described herein, a first transmission layer associated with the first TRP and a second transmission layer associated with the second TRP include a same number of usable time domain REs.

DETAILED DESCRIPTION

Figure 1:
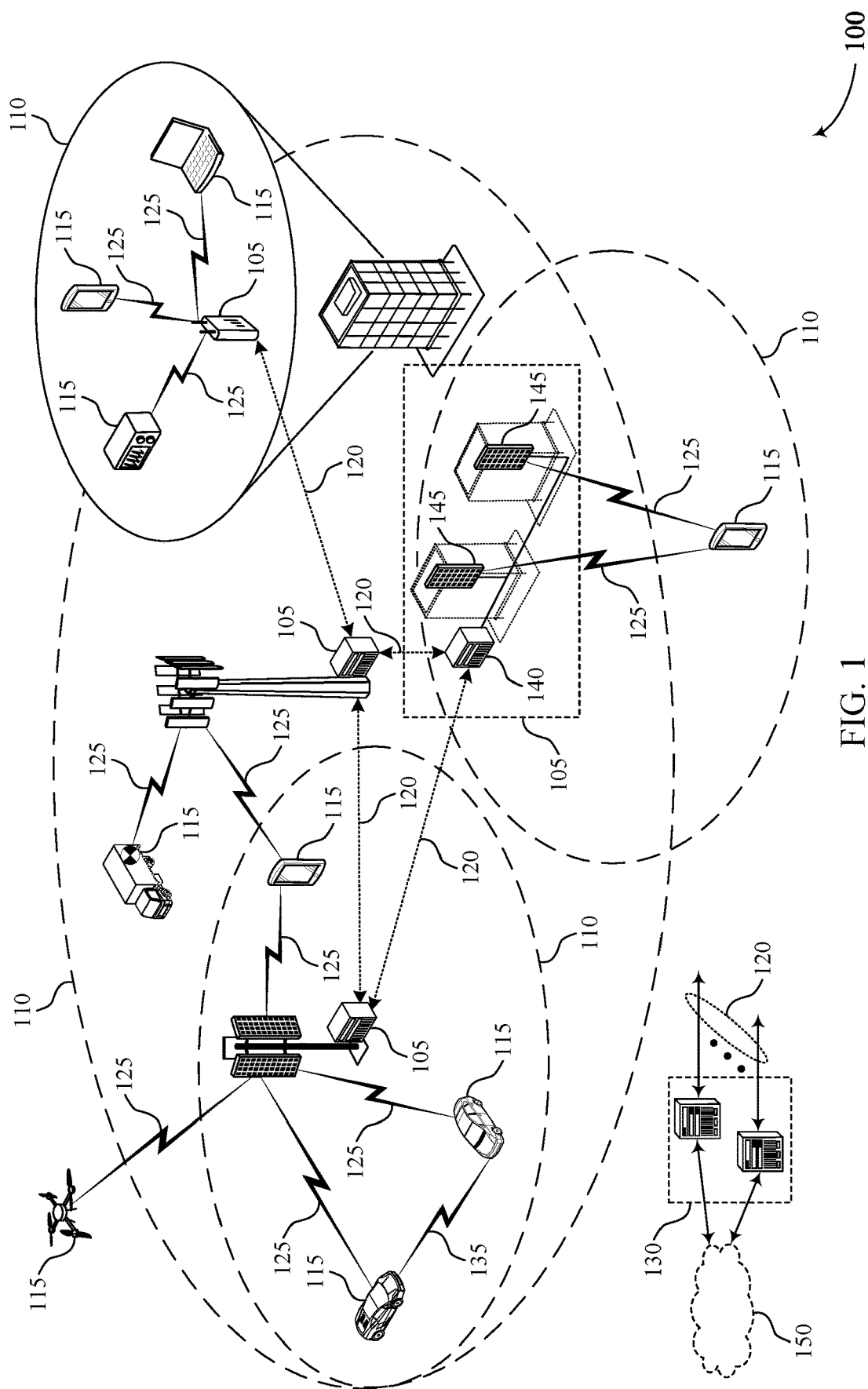
FIG. 1 illustrates an example of a wireless communications system that supports guard interval (GI) configurations for multiple links in accordance with aspects of the present disclosure.

A user equipment (UE) may communicate with multiple transmission reception points (TRPs), where a TRP may represent a base station, or a portion thereof, configured to transmit and receive wireless signals. For example, the UE may communicate with a first TRP and a second TRP, where at least some downlink transmissions from the TRPs to the UE may be concurrent. While the examples herein describe two TRPs, it is to be understood that the same examples may be extended to more than two TRPs without departing from the scope of the present disclosure. As described herein, two TRPs may represent different portions of a same cell or base station, or may represent different base stations. Communicating with multiple (e.g., two or more) TRPs may be referred to herein as operating in a multi-TRP mode, or performing multi-TRP operations.

In some cases, when operating in a multi-TRP mode, the UE (e.g., a receiver of UE) may use a common reception timing for joint processing of signals received (e.g., concurrently received) from the first TRP and the second TRP. For example, the UE may assume or expect that signals received from the first and second TRPs may be received at a same time, or within a same time frame (e.g., a beginning of a respective slot or symbol from both signals may fall within a cyclic prefix (CP) time frame). In some other cases, when operating in multi-TRP mode and when processing one or more signals from the first TRP, the UE may treat signals from the second TRP as asynchronous interference. However, in some cases, a processing performance of the UE may decrease when treating the second TRP as asynchronous interference, for example, compared to receiving synchronous transmissions from both TRPs (e.g., processing signals using synchronous interference). Further, communication quality may increase when signals received from the multiple TRPs are synchronous, which may support, for example, joint demodulation and/or increased interference suppression.

Further, in some higher frequency ranges, the UE may not receive signals from the multiple TRPs within a same time frame (e.g., within a CP duration, length, or time frame). For example, a CP length for some higher frequency ranges may be shorter than a CP length for lower frequency ranges. Such CP lengths may not account for, or cover, some signaling delays introduced by a signaling distance between the UE and the first TRP and/or the second TRP. As such, signals from the different TRPs (e.g., which may be at different locations, or may be associated with different signaling properties, such as a delay spread) may not fall within a same CP duration, which may result in increased interference and lower communication quality for these signals.

The present disclosure provides techniques to support reception of downlink transmissions from different TRPs within a same time frame, which may thereby increase signal quality. For example, each TRP in a multi-TRP mode (e.g., the first TRP and the second TRP) may append a GI to an end of each symbol, or each symbol period, of a transmission (e.g., instead of appending a CP to a beginning of each symbol period). A GI may represent a known sequence (e.g., known to UE, the first TRP, and the second TRP), such as a Zadoff-Chu sequence, a pseudo-random number sequence, or another known or defined sequence. A GI may be more flexible than a CP, and may, for example, support configuration of a respective GI duration for each of the TRPs. For example, each TRP may be configured with an individual GI duration (e.g., GI length).

The UE may determine a first GI duration for the first TRP and a second GI duration for second TRP and may transmit a signal to one or both of the TRPs to indicate the GI durations. The UE may, for example, determine the GI durations based on a difference in timing between signal reception from the first and second TRPs (e.g., a difference in delay spread between TRP and TRP). Based on the indicated GI durations, the first and second TRPs may transmit signaling to the UE that includes or implements the corresponding GI duration for each TRP (e.g., the signaling may include a GI appended at the end of each symbol period that has a GI duration corresponding to the respective TRP). The GI durations may be configured such that downlink transmissions from both TRPs and may be aligned at the UE. The alignment of the transmissions may increase signal quality for downlink transmissions at UE, for example, based on the performance of joint demodulation and increased interference suppression using the different GI durations.

Aspects of the disclosure are initially described in the context of wireless communications systems. Aspects of the disclosure are further illustrated by and described with reference to signaling diagrams, a flow diagram, a process flow, apparatus diagrams, system diagrams, and flowcharts that relate to guard interval configurations for multiple links.

FIG. 1 illustrates an example of a wireless communications system 100 that supports guard interval configurations for multiple links in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples. Devices in wireless communications system 100 may communicate over unlicensed spectrum, such as the 5 GHz band, the 2.4 GHz band, the 60 GHz band, the 3.6 GHz band, and/or the 900 MHz band. The unlicensed spectrum may also include other frequency bands.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

When a UE 115 operates in a multi-TRP mode (e.g., communicates with two or more TRPs), each TRP in the multi-TRP mode may append a GI to an end of each symbol, or each symbol period, of a transmission instead of appending a CP to a beginning of each symbol period. For example, the UE 115 may determine a first GI duration for a first TRP and a second GI duration for a second TRP and may transmit a signal to one or both of the TRPs to indicate the GI durations. Based on the indicated GI durations, the first and second TRPs may transmit signaling to the UE 115 that includes or implements the corresponding GI duration for each TRP (e.g., the signaling may include a GI appended at the end of each symbol period that has a GI duration corresponding to the respective TRP). The GI durations may be configured such that downlink transmissions from both TRPs and may be aligned at the UE 115.

Figure 2:
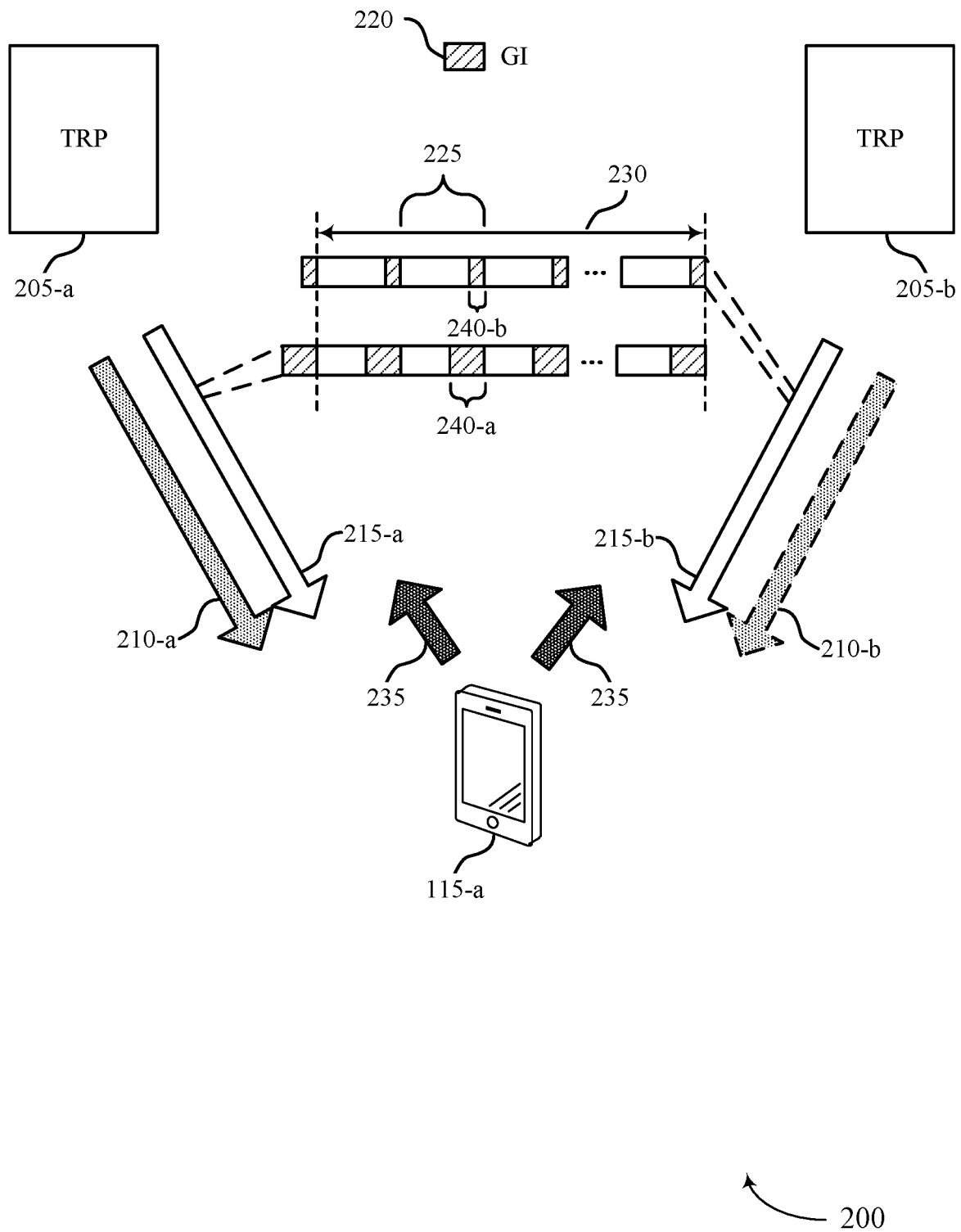
FIG. 2 illustrates an example of a wireless communications system that supports GI configurations for multiple links in accordance with aspects of the present disclosure.

FIG. 2 illustrates an example of a wireless communications system 200 that supports GI configurations for multiple links in accordance with aspects of the present disclosure. Wireless communications system may implement or be implemented by aspects of wireless communications system 100. For example, wireless communications system 200 may include a TRP 205-a, a TRP 205-b, and a UE 115-a, which may be examples of TRPs and a UE 115 described with reference to FIG. 1. While the examples herein describe two TRPs 205, it is to be understood that the same examples may be extended to more than two TRPs 205 without departing from the scope of the present disclosure. As described herein, two TRPs 205 may represent different portions of a same cell or base station 105, or may represent different base stations 105.

In some cases, UE 115-a may communicate with both TRP 205-a and TRP 205-b, which may result in an increase in data throughput, communication reliability, or both (e.g., based on communicating with more than one TRP 205). Communicating with multiple (e.g., two or more) TRPs 205 may be referred to herein as operating in a multi-TRP mode, or performing multi-TRP operations. The TRPs 205, and UE 115-a, may operate according to one of a set of modes for downlink control information (DCI) transmission and reception (e.g., in the multi-TRP mode). For example, in a single-DCI based mode (e.g., applicable to an ideal backhaul system, such as when TRPs 205-a and 205-b are connected via an ideal backhaul link associated with minimal information loss or latency) one TRP 205 (e.g., TRP 205-a) may transmit DCI to UE 115-a to schedule transmissions for either or both TRPs 205 (e.g., for TRP 205-a and/or TRP 205-b), while the other TRP 205 (e.g., TRP 205-b) may not transmit DCI to UE 115-a.

For example, in the single-DCI mode, TRP 205-a may communicate with UE 115-a via a downlink control channel 210-a (e.g., a physical downlink control channel (PDCCH)) and via a downlink shared channel 215-a (e.g., a physical downlink shared channel (PDSCH)). In this mode, TRP 205-b may communicate with UE 115-a via a downlink shared channel 215-b, but not via a downlink control channel 210-b. TRPs 205-a and 205-b may use one or more multiplexing schemes for downlink shared channels 215-a and 215-b, for example, to increase communication robustness. For example, downlink shared channels 215-a and 215-b may be associated with space division multiplexing (SDM), FDM, TDM, or any combination thereof, for communications with UE 115-a.

Additionally or alternatively, UE 115-a and the TRPs 205 may operate in a multi-DCI based mode (e.g., applicable to ideal or non-ideal backhaul), in which each TRP 205 (e.g., TRP 205-a and TRP 205-b) may transmit respective DCI to UE 115-a to schedule transmissions for that TRP 205 (e.g., for TRP 205-a or TRP 205-b). For example, in the multi-DCI mode, TRP 205-a may communicate with UE 115-a via downlink control channel 210-a and downlink shared channel 215-a, and TRP 205-b may communicate with UE 115-a via downlink shared channel 215-b and downlink control channel 210-b. In the multi-DCI mode, a carrier aggregation framework may be employed, such that UE 115-a may treat each TRP 205 as a different, virtual component carrier (CC), from the perspective of UE 115-a.

When operating in a single-DCI based multi-TRP scheme, UE 115-a (e.g., a receiver of UE 115-a) may use a common reception timing for joint processing of signals received from both TRP 205-a and TRP 205-b. For example, UE 115-a may assume or expect that signals received from TRP 205-a and TRP 205-b may be received at a same time, or within a same time frame (e.g., a beginning of a respective slot or symbol from both signals may fall within a CP time frame).

When operating in a multi-DCI based multi-TRP scheme, UE 115-a (e.g., the receiver of UE 115-a) may use a common reception timing or may use different reception timing for each TRP 205. For example, when processing signals for one TRP 205 (e.g., TRP 205-a), UE 115-a may treat signals from the other TRP 205 (e.g., TRP 205-b) as asynchronous interference. However, in some cases, a processing performance may decrease when treating the other TRP 205 as asynchronous interference, for example, compared to receiving synchronous transmissions from both TRPs 205 (e.g., processing signals using synchronous interference). Further, communication quality may increase when signals received from the multiple TRPs 205 are synchronous, which may support, for example, joint demodulation and/or increased interference suppression.

In some cases, such as at higher frequency ranges (e.g., in a mmW band, frequency range 2 (FR2), frequency range 3 (FR3), frequency range 4 (FR4)), UE 115-a may not receive signals from the multiple TRPs 205 within a same time frame (e.g., within a CP duration, length, or time frame). For example, a CP length for a subcarrier spacing (SCS) of 120 kHz, 480 kHz, and 960 kHz may respectively be 586 nanoseconds (ns), 146 ns, and 73 ns. Thus, at higher SCS values (e.g., larger frequency spreads for SCS) a symbol length, and an associated CP length, may shrink. Such CP lengths may not account for, or cover, some signaling delays introduced by a signaling distance. For example, a signal traveling 30 meters may result in a signaling delay (e.g., delay spread) of 100 ns (e.g., for the signal to travel the 30 meters). Such a delay may be larger than some CP lengths, and even larger delays may be introduced for larger signaling distances. As such, signals from different TRPs 205 (e.g., at different locations, or associated with different signaling properties, such as a delay spread) may not fall within a same CP duration, which may result in increased interference and lower communication quality for these signals.

The present disclosure provides techniques to support reception of downlink transmissions (e.g., via a downlink control channel 210, a downlink shared channel 215, or both) from TRPs 205-a and 205-b within a same time frame, and thereby increase signal processing quality. For example, each TRP 205 may append a GI 220 to an end of each symbol, or each symbol period 225, of a transmission (e.g., instead of appending a CP to a beginning of each symbol period). The GIs 220 may be more flexible than CPs, and may, for example, support different GI durations 240 for different TRPs 205. For example, each TRP 205 may be configured with an individual GI duration 240 (e.g., GI length). The GI duration 240 for a respective TRP 205 may be associated with (e.g., configured via) a transmission configuration indicator (TCI) state or a TCI state group for the TRP 205, or may be associated with signals scheduled by a CORESET pool index associated with the TRP 205.

A GI 220 may represent a known sequence (e.g., known to UE 115-a, TRP 205-a, and TRP 205-b), such as a Zadoff-Chu sequence, a pseudo-random number sequence, or a known or defined sequence. A GI 220 may be similar to, but different from a CP, where a CP may be include random data (e.g., data that forms part of information communicated wirelessly). Both a CP and a GI 220 may be configured to convert a linear convolution of transmitted symbols (e.g., symbol periods 225) to a circular convolution, which may support simplification of a frequency domain equalization at a receiver (e.g., may support a one-tap frequency domain equalization). Similarly, a CP and a GI 220 may both be configured to reduce or avoid inter-symbol interference (ISI), as well as maintain symbol and/or slot alignment, within wireless communications.

A GI 220 may further reduce phase noise (e.g., provide phase noise compensation), reduce frequency errors (e.g., provide frequency error tracking), and may also be utilized for phase tracking and synchronization. A GI 220 may also be more adaptable to different delay spreads, without changing a curation of a symbol period 225, than a CP. A CP may also fall outside of a discrete Fourier transform (DFT) of a symbol period 225, while a GI 220 may fall inside the DFT (e.g., because the GI 220 may be appended to an end of the symbol period 225, while the CP may be appended to a beginning of the symbol period 225). Further, each CP may fall within a slot boundary, while a GI 220 associated with a first symbol period 225 of a slot may fall outside of the slot boundary.

UE 115-a may determine a GI duration 240-a for TRP 205-a and a GI duration 240-b for TRP 205-b and may transmit a signal 235 to one or both of the TRPs 205 to indicate the GI durations 240-a and 240-b (e.g., may indicate the GI durations 240-a and 240-b via uplink control information (UCI), a MAC control element (CE), or via RRC signaling to one or both of the TRPs 205). UE 115-a may, for example, determine GI durations 240-a and 240-b based on a difference in timing between signal reception from TRPs 205-a and 205-b (e.g., a difference in delay spread between TRP 205-a and TRP 205-b), such as via the downlink shared channels 215-a and 215-b. In some cases, UE 115-a may additionally or alternatively report a timing difference across the TRPs 205 (e.g., or across the associated TCI states, TCI state groups, or CORESET pool indexes). The GI durations 240-a and 240-b may have a duration similar to the delay spread for the corresponding TRP 205, or may have a different duration. In some cases, the GI duration 240 for a corresponding TRP 205 may be at least as large as the delay spread for the TRP 205.

Based on the indicated GI durations 240-a and 240-b, TRP 205-a and TRP 205-b may transmit signaling to UE 115-a that includes or implements the corresponding GI duration 240 (e.g., may include a GI 220 appended at the end of each symbol period that has a GI duration 240 corresponding to the TRP 205). The GI durations 240-a and 240-b may be configured such that downlink transmissions from both TRP 205-a and 205-b may be aligned. For example, a transmission from TRP 205-a and a transmission from TRP 205-b may both align with a same window 230 (e.g., a slot) when transmitted from the corresponding TRP 205. The alignment may be based on the GI durations 240-a and 240-b, as well as any signaling delays in the respective downlink shared channels 215 or downlink control channels 210.

UE 115-a may further place or configure its receive timing (e.g., for transmissions from TRP 205-a and 205-b) to correspond to a link (e.g., a link with TRP 205-a or TRP 205-b) that has a shorter delay (e.g., and is associated with a shorter GI 220). In such cases, signals from the other TRP 205 may have a larger signal delay, which may be accommodated by a longer GI 220. Based on the different GI durations 240 for the different TRPs 205, which may account for signaling delays or a difference in delay spread between the TRPs 205, the signals (e.g., a beginning of a symbol or slot of a signal) from the different TRPs 205 may fall within a GI time frame at UE 115-a (e.g., may also align at UE 115-a). The alignment of the transmissions may increase signal quality for downlink transmissions at UE 115-a, for example, based on the performance of joint demodulation and increased interference suppression using the different GI durations 240.

In some cases, different respective GI durations 240 may be implemented for two or more different wireless transmitting devices, for example, in any case where a receiving wireless device receives signals from two or more transmitting devices. For example, different respective GI durations 240 may be implemented for simultaneous reception on a backhaul link and an access link of an integrated access and backhaul (IAB) node. In such examples, the IAB node may receive, at a same time or concurrently, a downlink transmission from a parent node, as well as an uplink transmission from a UE 115. In some other examples, different GI durations 240 may be implemented for simultaneous reception on a base-station-to-UE link (e.g., a Uu link), as well as a sidelink link. For example, a base station 105 may attempt to receive an uplink shared channel (e.g., a physical uplink shared channel (PUSCH)) and a sidelink shared channel (e.g., a physical sidelink shared channel (PSSCH)), or a UE 115 may attempt to receive a downlink shared channel (e.g., a physical downlink shared channel (PDSCH)) and a sidelink shared channel (e.g., PSSCH).

In some other examples, different GI durations 240 may be implemented for simultaneous reception of multiple sidelink transmissions. For example, a UE 115 may attempt to receive a sidelink control channel (e.g., a physical sidelink control channel (PSCCH)) or a sidelink shared channel (e.g., PSSCH) from multiple transmitting devices. In some other examples, different GI durations 240 may be implemented for simultaneous transmission and reception in a full duplex mode. For example, a wireless communications node (e.g., a UE 115, a base station 105) may attempt to transmit and receive a signal at a same time (e.g., concurrently), with different timings.

Figure 3A:
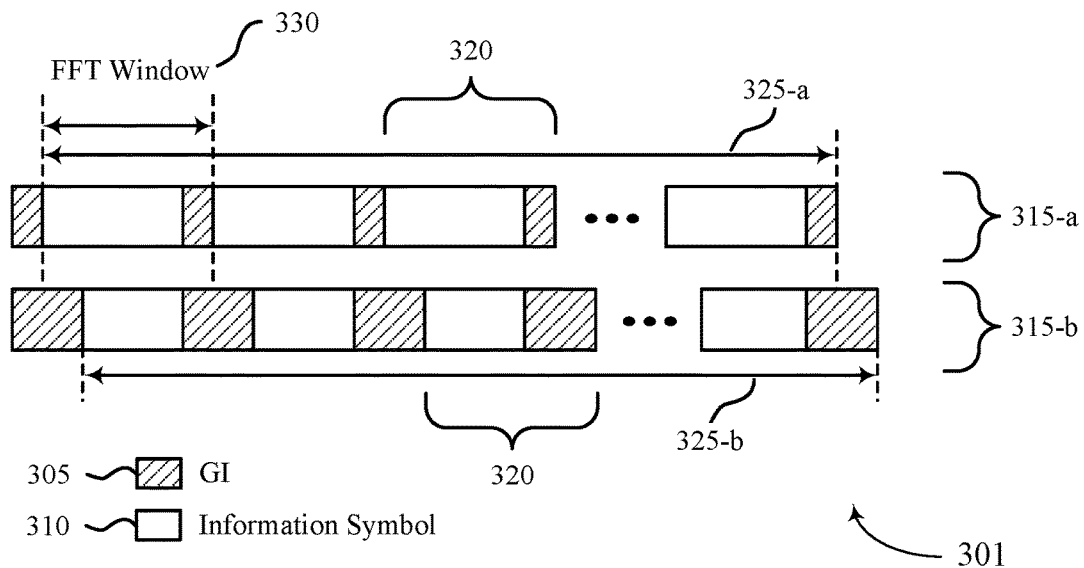
FIGS. 3A, 3B, and 3C illustrate examples of signaling diagrams that support GI configurations for multiple links in accordance with aspects of the present disclosure.
Figure 3B:
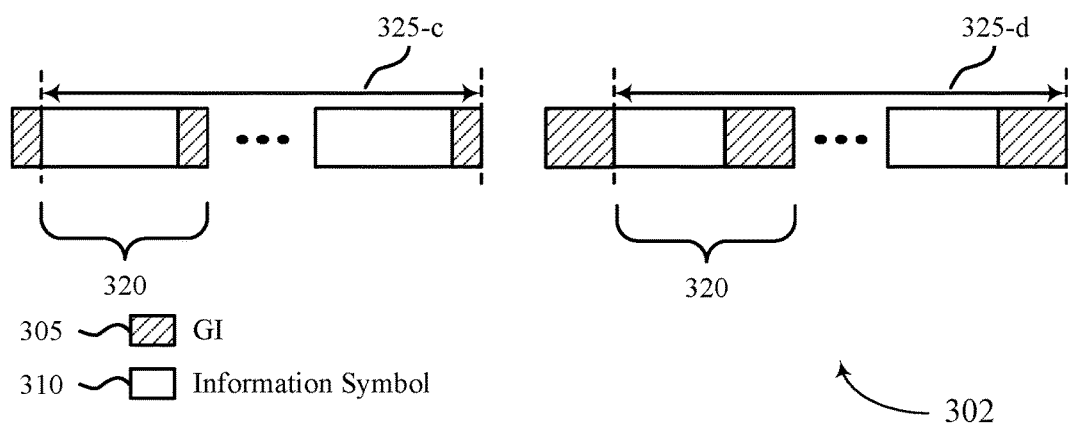
Figure 3C:
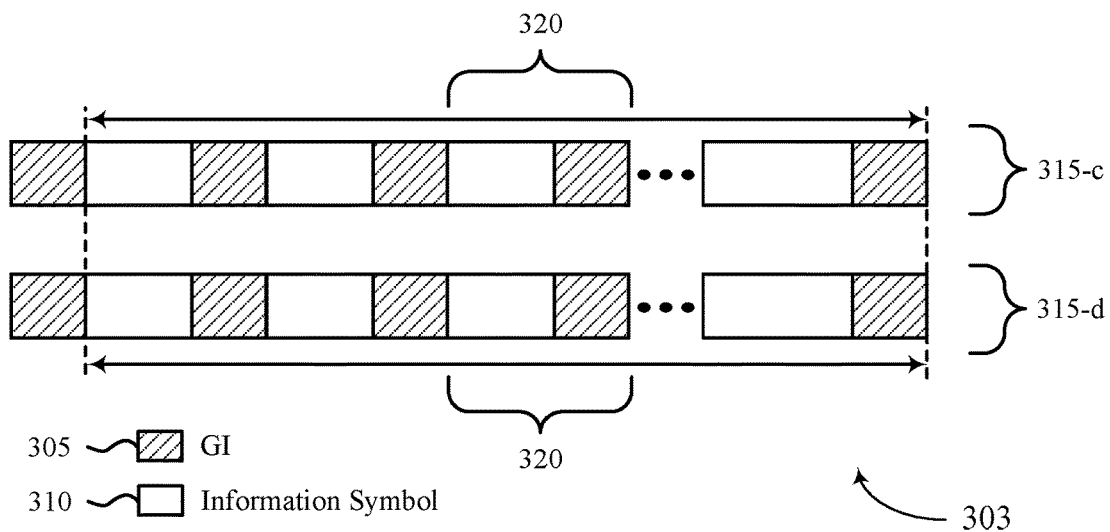

FIGS. 3A, 3B, and 3C illustrate examples of signaling diagrams 301, 302, and 303 that support GI configurations for multiple links in accordance with aspects of the present disclosure. Signaling diagrams 301, 302, and 303 may implement or be implemented by one or more aspects of wireless communications system 100 or 200. For example, signaling diagrams 301, 302, and 303 may represent one or more signals transmitted from a first TRP, a second TRP, or both, as described with reference to FIGS. 1 and 2. The one or more signals may be transmitted to a UE 115, which may be an example of a UE 115 described with reference to FIGS. 1 and 2. As described with reference to FIG. 2, the first TRP and the second TRP may each use a respective GI 305 (e.g., a respective GI length) for downlink transmissions to the UE 115.

FIG. 3A, for example, illustrates the one or more signals transmitted by the first TRP and the second TRP, as received by the UE 115, where signaling 315-a may be received from the first TRP and signaling 315-b may be received from the second TRP. Such signaling 315 (e.g., signals received concurrently from two or more TRPs) may be associated with a multiplexing technique, such as FDM or SDM, which may support concurrent reception of signals at a receiving device.

Each signaling 315 may include multiple symbol periods 320, where each symbol period may include a respective GI 305 (e.g., that corresponds to the GI duration for the associated TRP) and an information symbol 310 (e.g., a portion of the signal that conveys information from the associated TRP to the UE 115). The UE 115 may receive each signaling 315 within a respective time frame 325 (e.g., a slot). For example, the UE 115 may receive signaling 315-a from the first TRP within a time frame 325-a and may receive signaling 315-b from the first TRP within a time frame 325-b. Because each TRP may be associated with a different signaling delay (e.g., propagation delay) or delay spread relative to UE 115, the signals may arrive at different times. For example, the second TRP (e.g., the signaling 315-b from the second TRP) may be associated with a larger propagation delay than the first TRP (e.g., the signaling 315-a from the first TRP).

As described herein with reference to FIG. 2, each TRP may be associated with a respective GI duration, which may correspond to the propagation delay of the associated TRP. As such, the first TRP may be associated with a GI 305 having a first GI duration and the second TRP may be associated with a GI 305 having a second GI duration. Based on the larger propagation delay form the second TRP, the second GI duration may be longer than the first GI duration. The different GI durations may support reception of the signaling 315-a and 315-b within a same time period. For example, signaling 315-a and 315-b may both begin to be received by the UE 115 within a GI duration of the second TRP, as illustrated by FIG. 3A. Additionally, an information symbols 310 from both TRPs may fall within a same fast Fourier transform (FFT) window 330 (e.g., a window for processing signals at the UE 115), as illustrated by FIG. 3A. As such, the UE 115 may support concurrent reception and processing of signals from both TRPs with a reduced amount of interference and a higher signal alignment (e.g., and higher associated processing capabilities).

In some cases, the UE 115 may communicate with the first TRP and the second TRP using a TDM scheme (e.g., a TDM multi-TRP scheme). For example, FIG. 3B may illustrate an example scenario of TDM communications with two TRPs. In such cases, the signaling from the different TRPs may be received at different times (e.g., at different time frames 325), respectively, based on the TDM scheme. For example, the UE 115 may receive signaling from the first TRP over a time frame 325-c and signaling from the second TRP over a time frame 325-d. When using a TDM scheme for multi-TRP communications, the UE 115 (e.g., a receiver of the UE 115) may apply different reception timings to the communications from the respective TRPs. However, applying a similar or same reception timing across the symbol periods 320 and/or associated slots for the different TRPs may simplify receiver processing at the UE 115.

Additionally or alternatively, the first and second TRPs may communicate with the UE 115 using single frequency network (SFN) transmission, where the first and second TRPs may transmit a same signal to the UE 115. In such cases, multiple TCI states (e.g., each associated with a respective TRP) may be associated with the SFN transmission. In some cases, the SFN transmission (e.g., one or more properties of the SFN transmission) may not support usage of different GI durations for different TRPs. For example, one or more SFN properties may not be maintained when using different GI durations for the different TRPs.

In order to simplify receiver processing for a TDM scheme, or in order to support SFN transmissions, the first TRP and the second TRP may apply a same GI 305, or a same GI length or duration, to their respective communications to the UE 115. For example, as illustrated by FIG. 3C, signaling 315-c (e.g., from the first TRP) and signaling 315-d (e.g., from the second TRP) may both use a same GI duration within each symbol period 320. The same GI duration may be based on a longer or larger GI duration determined for the first TRP or the second TRP (e.g., a larger GI duration determined as if the two TRPs were to have different GI durations).

For example, the UE 115 may determine a first GI duration for the first TRP and a second GI duration for the second TRP (e.g., based on a respective delay spread, based on frequency tracking) and may report a largest GI duration (e.g., of the first and second GI durations) for use in communications with both the first TRP and the second TRP. Additionally or alternatively, the UE 115 may determine and report a first GI duration for the first TRP and a second GI duration for the second TRP, and the TRPs may determine to use a largest GI duration of the first and second GI durations. In either of these examples, the UE 115 and/or the TRPs may determine to use the largest GI duration based on communicating using a TDM scheme or using and SFN. In some cases, the largest GI duration may correspond to signaling from a TRP that is associated with a largest propagation delay.

In some cases, the first TRP, the second TRP, or both, may receive one or more sounding reference signals (SRSs) from the UE 115 and may each determine a respective GI length or duration based on the SRSs. For example, the first TRP and the second TRP may each determine a respective propagation delay to the UE 115, based on the received SRS(s), and may determine a respective GI length or duration based on the propagation delay. In some cases, the first TRP and the second TRP may also communicate their respective GI lengths with each other (e.g., via a backhaul link), and may determine to use a largest GI length of the respective GI lengths (e.g., for TDM communications or when using an SFN).

Based on using a same GI (e.g., a largest GI, associated with a largest delay spread or propagation delay), the UE 115 may receive signals from the TRPs that may align at the UE 115, which may support an decrease in processing complexity and a decrease in interference associated with such communications. For example, the UE 115 may receive signaling 315-*c* and signaling 315-*d* concurrently (e.g., for an SFN transmission) or may receive signaling 315-*c* and signaling 315-*d* at different times (e.g., for a TDM communications scheme). Based on receiving signaling 315-*c* and 315-*d* using the same GI duration or length, the UE 115 may support increased processing capabilities and may experience decreased interference.

Figure 4:
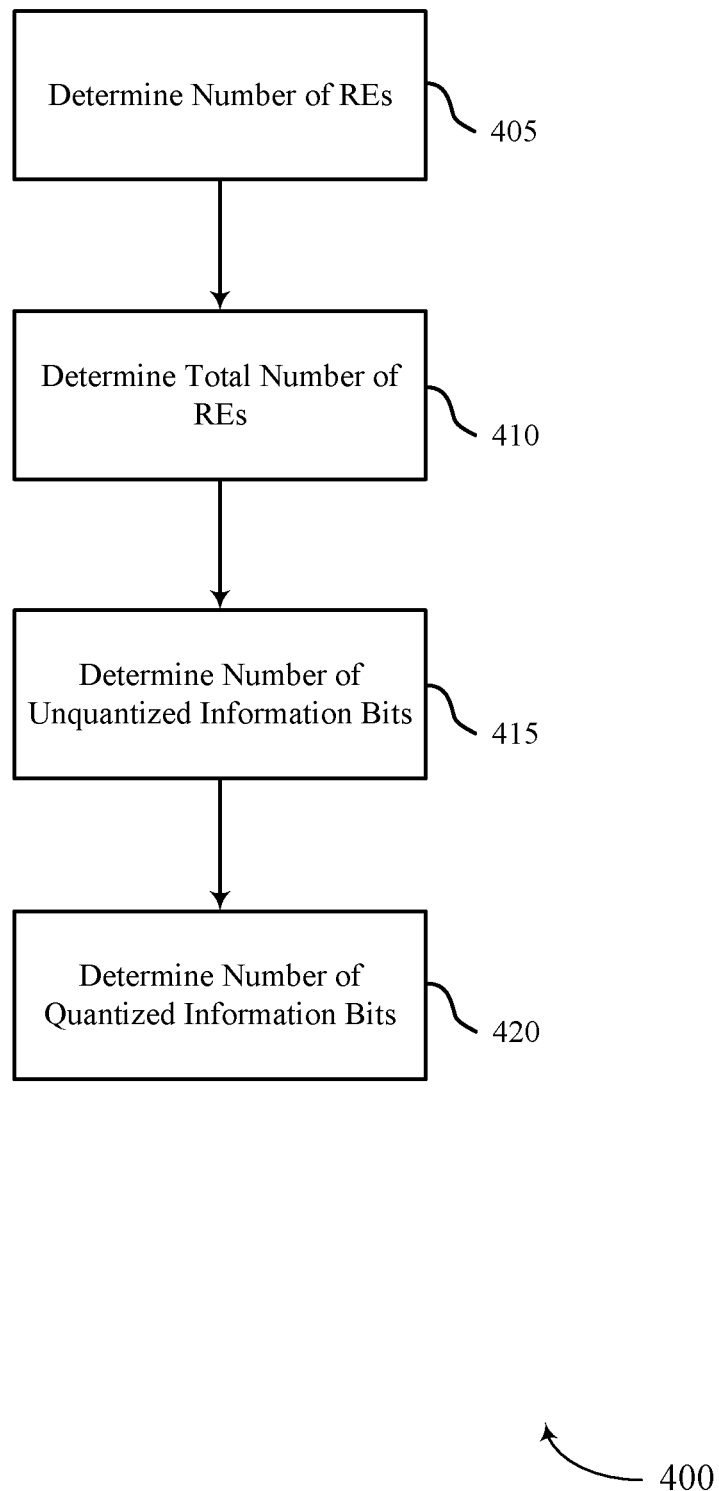
FIG. 4 illustrates an example of a flow diagram that supports GI configurations for multiple links in accordance with aspects of the present disclosure.

FIG. 4 illustrates an example of a flow diagram 400 that supports GI configurations for multiple links in accordance with aspects of the present disclosure. Flow diagram 400 may implement or be implemented by one or more aspects of wireless communications system 100 or 200. For example, flow diagram 400 may be implemented by one or more a TRP, a UE 115, or both, in order to determine a transport block size (TBS) for one or more transmissions from the TRP to the UE 115, where the TRP and the UE 115 may be examples of a TRP and a UE 115 described with reference to FIGS. 1-3. The one or more transmissions may be transmitted from the TRP to the UE 115, where the UE 115 may also receive one or more transmissions from a second TRP (e.g., the UE 115 may operate in a multi-TRP mode). As described with reference to FIG. 2, the TRP and the second TRP may each use a respective GI length or duration for downlink transmissions to the UE 115.

One or more rate matching processes may be affected by each TRP being associated with a respective GI length or duration. For example, a TBS may be determined based on a number of available resource elements (REs) per physical resource block (PRB), a number of PRBs, a code rate, a modulation order, and a number of transmission layers. When determining a TBS, one or more assumptions may hold, such as that each symbol may have a same amount of CP overhead, that each resource block (RB) has a same number of usable REs, and that each transmission layer has a same number of usable REs. When communicating with two TRPs having different amounts of symbol overhead (e.g., different amounts of GI overhead, similar to CP overhead), the one or more assumptions may no longer hold, or one or more of the parameters for determining the TBS may be different for different TRPs (e.g., there may be an impact on rate matching).

In such cases, the UE 115 and/or the TRP (e.g., and the second TRP) may determine the TBS for multi-TRP communications according to the techniques described herein. For example, the UE 115 and/or the TRP may determine a number of unquantized information bits separately for each TRP (e.g., for the TRP and the second TRP), based on a number of REs and a number of PRBs associated with the respective TRP (e.g., among other parameters). The UE 115 and/or the TRP may add the number of unquantized information bits for both of the TRPs, and may determine the TBS based on the total number of unquantized information bits.

At 405, the UE 115 and/or TRP may determine a number of REs (e.g., $N_E$) usable by the UE 115 (e.g., specific to communications with the UE 115) for communications with a respective TRP (e.g., the TRP or the second TRP). For example, the number of REs for the respective TRP may be determined using an equation similar to Equation (1):

$$N_{RE}' = N_{SC}^{RB} N_{symb} - N_{DMRS}^{PRB} - N_{oh}^{PRB} \tag{1}$$

where $N_{RE}'$ represents the number of REs usable by the UE 115 for communications with the respective TRP, $N_{SC}^{RB}$ represents a number of RBs which may equal 12, $N_{symb}$ represents a number of symbols in a resource assignment from the respective TRP, $N_{DMRS}^{PRB}$ represents a number of REs used for demodulation reference signals (DMRSs) per PRB in the resource assignment, and $N_{oh}^{PRB}$ represents an amount of configured overhead per PRB for the respective TRP (e.g., as configured via a higher layer parameter).

At 410, the UE 115 and/or TRP may determine a total number of REs allocated to the resource assignment from the respective TRP. For example, the total number of REs may be determined using an equation similar to Equation (2):

$$N_{RE} = \min(156, N_{RE}') * n_{PRB} \tag{2}$$

where $N_{RE}$ represents the total number of allocated REs, min represents a minimum function, $N_E$ represents the number of REs usable by the UE 115 for communications with the respective TRP, and $n_{PRB}$ represents a number of RBs allocated to the resource assignment for the respective TRP. The minimum function may return a minimum value of the number of REs usable by the UE 115 and 156 REs, which may limit a maximum processing load of the UE 115 to be no more than 156 REs (e.g., per RB).

At 415, the UE 115 and/or the TRP may determine a total number of unquantized information bits, based on a number of unquantized information bits for each TRP. For example, a number of unquantized information bits for the respective TRP may be determined using an equation similar to Equation (3):

$$N_{info}^{TRP} = N_{RE} * R * Q_m * v \tag{3}$$

where $N_{info}^{TRP}$ represents the number of unquantized information bits for the respective TRP (e.g., the TRP or the second TRP, based on prior calculations for the same TRP), $N_{RE}$ represents the number of REs usable by the UE 115 for communications with the respective TRP, R represents a code rate for communications with the respective TRP, $Q_m$ represents the modulation order for communications with the respective TRP, and v represents the number of transmission layers for communications with the respective TRP.

The UE 115 and/or TRP may repeat the techniques at 405 through 415 for each TRP in communication with the UE 115 (e.g., the TRP and the second TRP), in order to determine a respective number of unquantized information bits for each TRP. The UE 115 and/or TRP may determine a total number of unquantized information bits as the sum of each of the unquantized information bits, across all of the TRPs, for example, as determined using an equation similar to Equation (4):

$$N_{info} = N_{info}^{TRP1} + N_{info}^{TRP2} \tag{4}$$

where $N_{info}$ represents the total number of unquantized information bits, $N_{info}^{TRP1}$ represents the number of unquantized information bits for the TRP (e.g., a first TRP), and $N_{info}^{TRP2}$ represents the number of unquantized information bits for the second TRP (e.g., a different TRP). Such an equation may be extended to any number of TRPs without departing from the scope of the present disclosure. In the above described techniques, it may be assumed that each RB and each transmission layer may have a same number of usable time domain REs, for a respective TRP.

At 420, the UE 115 and/or the TRP may determine a number of quantized information bits for the TBS based on the number of unquantized information bits (e.g., $N_{info}$).

In some cases, a respective GI duration for a TRP may also be changed or adjusted over time. For example, the GI duration may change from one slot, mini-slot, or repetition to another respective slot, mini-slot, or repetition, among other examples (e.g., and may remain the same within a slot, mini-slot, or repetition). The UE 115 may report (e.g., to the TRP, the second TRP, or both) a rate for updating the GI, or an update boundary for updating the GI, based on a UE capability. For example, the UE 115 may report an amount of time or a number of frames, slots, mini-slots, or repetitions (e.g., among other examples) in which the UE 115 may support changes to the GI. The supported time frame or number of time periods may, for example, represent a time frame from a requested change in GI duration until the change takes effect.

The time frame may support, for example, an amount of time to for the UE 115 to update a TBS based on the new GI duration. As such, the UE 115 may determine that the GI may change and the associated TBS may be updated at a time interval indicated by the UE capability (e.g., or indicated by the corresponding TRP). Additionally or alternatively, the UE 115 may not expect the GI to change and the associated TBS to be updated within the time interval indicated by the UE capability.

Figure 5:
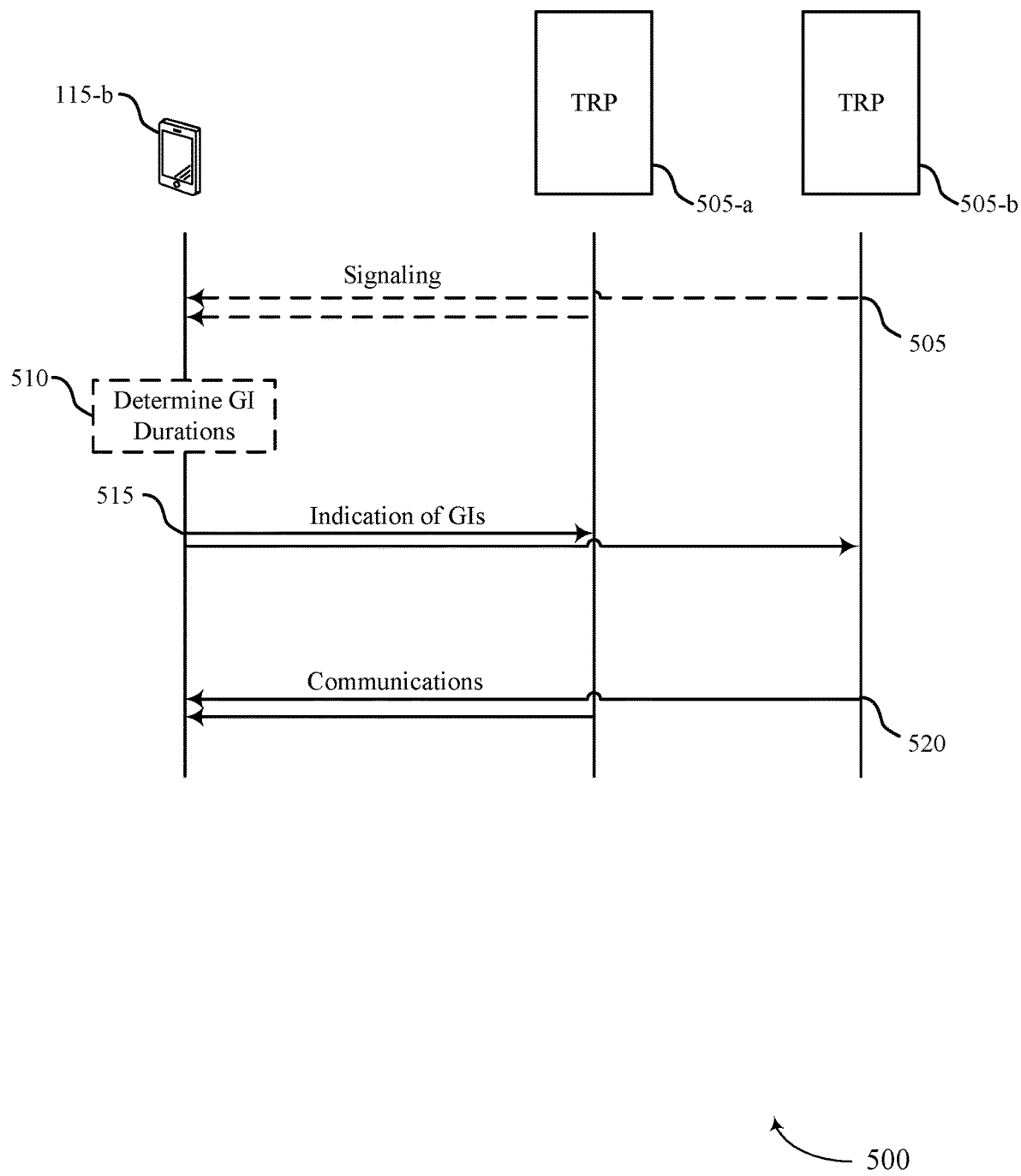
FIG. 5 illustrates an example of a process flow that supports GI configurations for multiple links in accordance with aspects of the present disclosure.

FIG. 5 illustrates an example of a process flow 500 that supports GI configurations for multiple links in accordance with aspects of the present disclosure. Some aspects of process flow 500 may implement or be implemented by one or more aspects of wireless communications system 100 or 200. For example, process flow 500 may be implemented by a UE 115-*b*, and TRPs 405-*a* and 405-*b*, which may be examples of a UE 115 and TRPs described with reference to FIGS. 1-4. The base station 105-*b* and the UE 115-*b* may implement process flow 500 in order to respectively transmit or validate one or more CSI-RS, as described herein.

In the following description of process flow 500, the operations may be performed in a different order than the order shown, or the operations performed by UE 115-*b*, TRP 505-*a*, and TRP 505-*b* may be performed in different orders or at different times. For example, some operations may also be left out of process flow 500, or other operations may be added to process flow 500. Although UE 115-*b*, TRP 505-*a*, and TRP 505-*b* are shown performing the operations of process flow 500, some aspects of some operations may also be performed by one or more other wireless devices.

At 505, in some cases, TRP 505-*a* and TRP 505-*b* may each signal one or more respective downlink transmissions to UE 115-*b*. In some cases, the signaling from TRP 505-*a* and TRP 505-*b* may be concurrent, or may at least partially overlap. The signaling may, in some cases, arrive at UE 115-*b* at different times, or according to different propagation delays or delay spreads.

At 510, UE 115-*b* may determine a first GI duration for downlink signals from TRP 505-*a* and a second GI duration for downlink signals from TRP 505-*b*. For example, UE 115-*b* may determine the first and second GI durations based on a timing difference between signaling from TRP 505-*a* and signaling from TRP 505-*b*. In some cases, the first GI duration and the second GI duration may be different durations (e.g., the first GI duration may be longer than the second GI duration. In some other cases, the first and second GI durations may be the same duration. For example, UE 115-*b* may identify a first signal delay for TRP 505-*a* and a second signal delay for TRP 505-*b* and may select a same duration for the first and second GI durations (e.g., based on communicating using a TDM scheme or using an SFN), where the duration may be based on a largest signal delay for TRPs 505-*a* and 505-*b*.

At 515, UE 115-*b* may transmit, to TRP 505-*a*, TRP 505-*b*, or both, an indication of the first GI duration and the second GI duration. For example, UE 115-*b* may transmit a first indication identifying a first TCI state, a first TCI state group, a first CORESET pool index, or any combination thereof, associated with TRP 505-*a* and the first GI duration. Similarly, UE 115-*b* may transmit a second indication identifying a second TCI state, a second TCI state group, a second CORESET pool index, or any combination thereof, associated with TRP 505-*b* and the second GI duration.

At 520, TRP 505-*a* and TRP 505-*b* may communicate with UE 115-*b* during a first set of multiple symbol periods and a second set of multiple symbol periods, respectively, according to the first GI duration and the second GI duration, respectively. For example, each symbol period of the first set may include a first portion that includes a first information symbol and a second portion that has the first GI duration and at least a part of a GI sequence. Similarly, each symbol period of the second set may include a first portion that includes a second information symbol and a second portion that has the second GI duration and at least a part of the GI sequence.

In some cases, UE 115-*b* may perform a signal processing operation (e.g., a FFT operation) on the first portion of the symbol periods and the second portion of the symbol periods within a same time period or same time window. In some cases, UE 115-*b*, TRP 505-*a*, TRP 505-*b*, or any combination thereof, may determine a TBS for the communications according to one or more examples described herein, for example, with respect to FIG. 4. For example, UE 115-*b*, TRP 505-*a*, or TRP 505-*b* may determine a TBS based on a UE capability (e.g., a time period) for changing a GI duration (e.g., as indicated to TRP 505-*a*, 505-*b*, or both). Similarly, UE 115-*b*, TRP 505-*a*, or TRP 505-*b* may determine a first quantity of unquantized information bits of a transport block (TB) corresponding to TRP 505-*a* and a second quantity of unquantized information bits of a TB corresponding to TRP 505-*b*. UE 115-*b*, TRP 505-*a*, or TRP 505-*b* may determine the TBS applicable to TRP 505-*a* and TRP 505-*b* based on a sum of the first and second quantities of bits.

Figure 6:
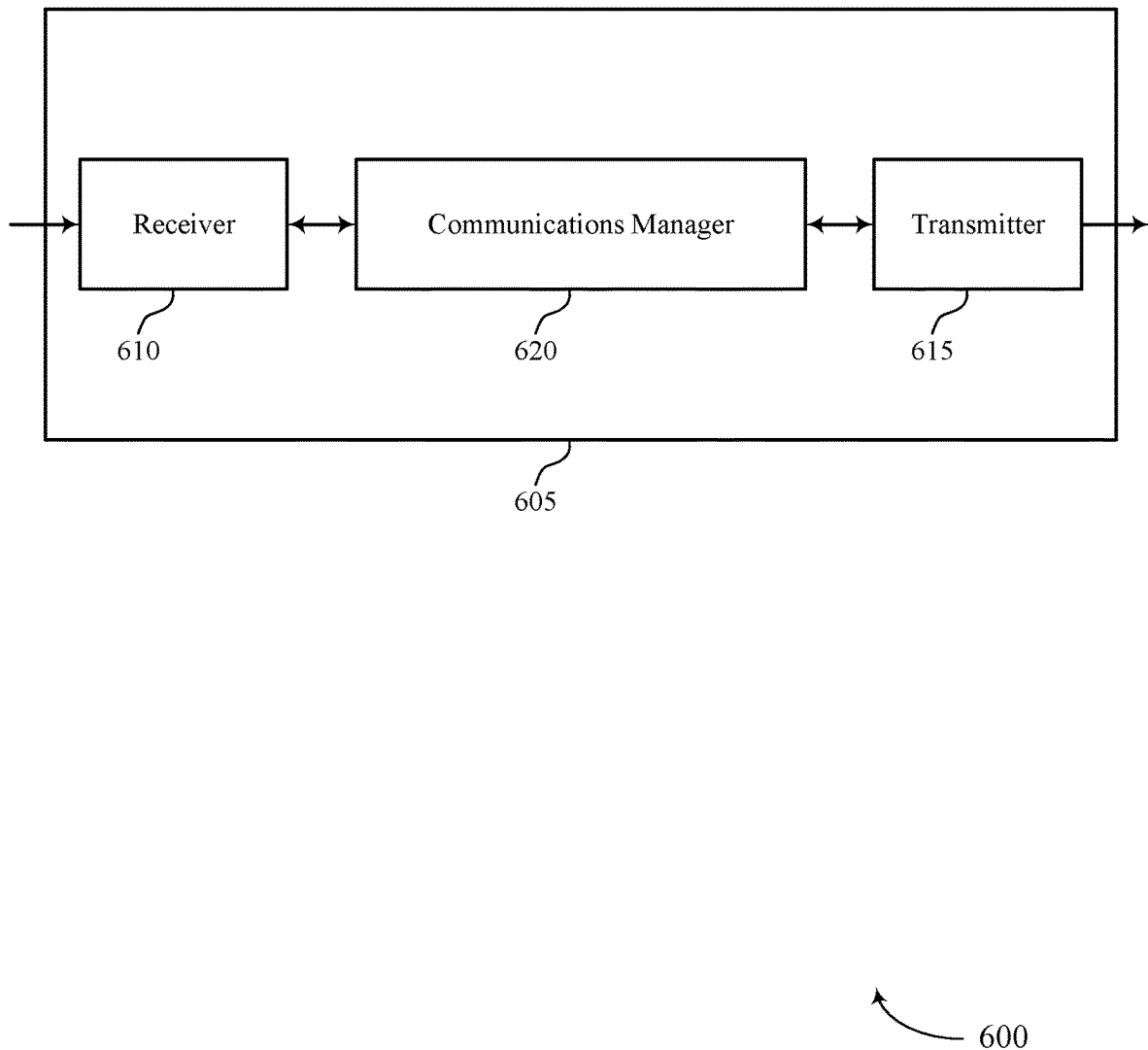
FIGS. 6 and 7 show block diagrams of devices that support GI configurations for multiple links in accordance with aspects of the present disclosure.

FIG. 6 shows a block diagram 600 of a device 605 that supports GI configurations for multiple links in accordance with aspects of the present disclosure. The device 605 may be an example of aspects of a UE 115 as described herein. The device 605 may include a receiver 610, a transmitter 615, and a communications manager 620. The device 605 may also include one or more processors, memory coupled with the one or more processors, and instructions stored in the memory that are executable by the one or more processors to enable the one or more processors to configure GI configurations for multiple links discussed herein. Each of these components may be in communication with one another (e.g., via one or more buses).

The receiver 610 may provide a means for receiving information such as packets, user data, control information, or any combination thereof associated with various information channels (e.g., control channels, data channels, information channels related to GI configurations for multiple links). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to GI configurations for multiple links). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of GI configurations for multiple links as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for transmitting an indication of a first GI duration for downlink signals from a first TRP and a second GI duration for downlink signals from a second TRP. The communications manager 620 may be configured as or otherwise support a means for communicating with the first TRP during a first set of multiple symbol periods, each symbol period of the first set of multiple symbol periods including a first portion that includes a first information symbol and a second portion that has the first GI duration and includes at least a part of a GI sequence. The communications manager 620 may be configured as or otherwise support a means for communicating with the second TRP during a second set of multiple symbol periods, each symbol period of the second set of multiple symbol periods including a first portion that includes a second information symbol and a second portion that has the second GI duration and includes at least a part of the GI sequence.

The actions performed by the communications manager 620, among other examples herein, may be implemented to realize one or more potential advantages. For example, communications manager 620 may increase available battery power and communication quality at a wireless device (e.g., a UE 115) by supporting configuration of a respective GI duration for each TRP in a multi-TRP communication scenario. The associated increase in communication quality may result in increased link performance and decreased overhead based on determining and applying a respective GI duration for each TRP. Accordingly, communications manager 520 may save power and increase battery life at a wireless device (e.g., a UE 115) by strategically increasing a quality of communications at a wireless device (e.g., a UE 115).

Figure 7:
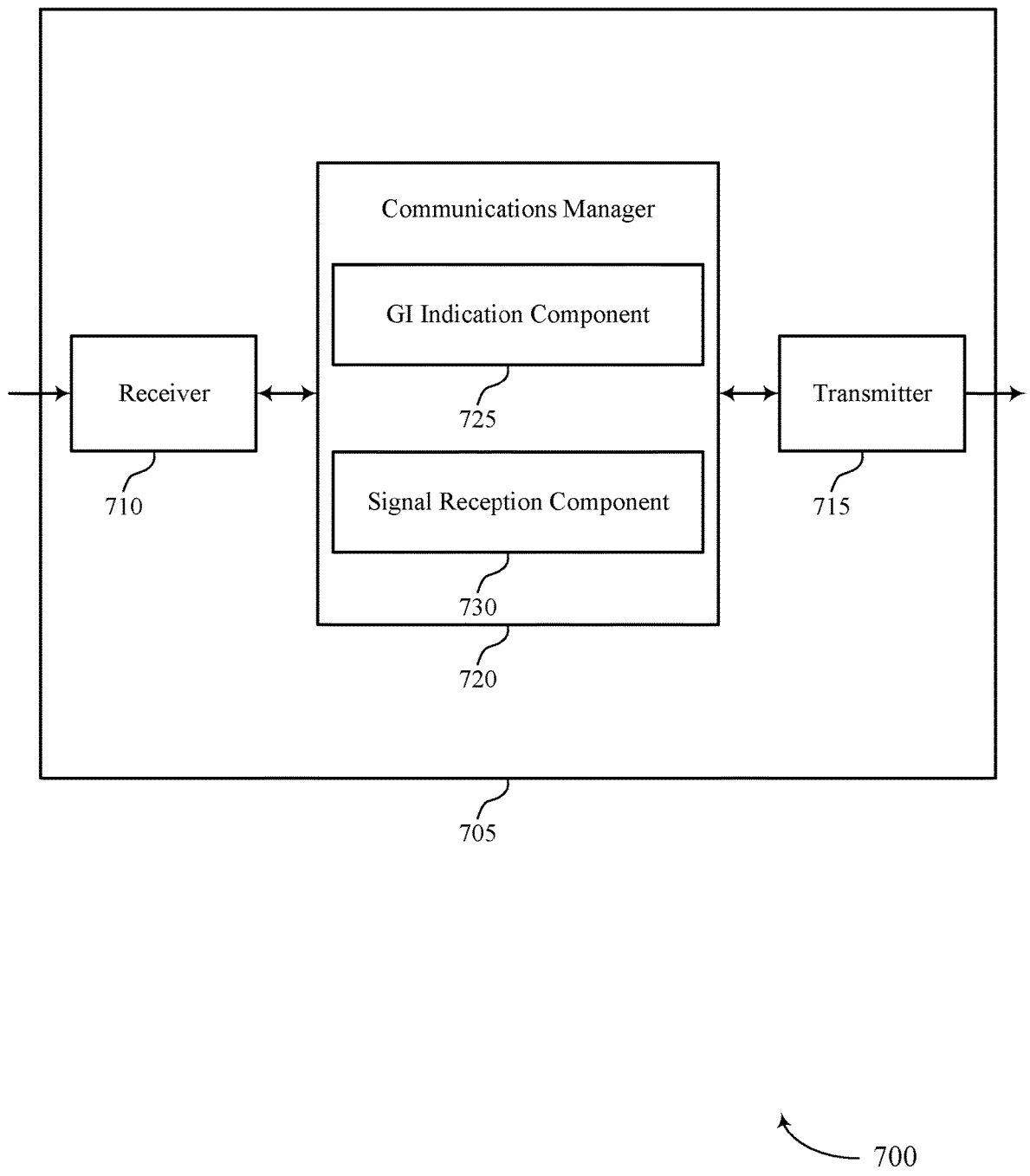

FIG. 7 shows a block diagram 700 of a device 705 that supports GI configurations for multiple links in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to GI configurations for multiple links). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to GI configurations for multiple links). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of GI configurations for multiple links as described herein. For example, the communications manager 720 may include a GI indication component 725 a signal reception component 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The GI indication component 725 may be configured as or otherwise support a means for transmitting an indication of a first GI duration for downlink signals from a first TRP and a second GI duration for downlink signals from a second TRP. The signal reception component 730 may be configured as or otherwise support a means for communicating with the first TRP during a first set of multiple symbol periods, each symbol period of the first set of multiple symbol periods including a first portion that includes a first information symbol and a second portion that has the first GI duration and includes at least a part of a GI sequence. The signal reception component 730 may be configured as or otherwise support a means for communicating with the second TRP during a second set of multiple symbol periods, each symbol period of the second set of multiple symbol periods including a first portion that includes a second information symbol and a second portion that has the second GI duration and includes at least a part of the GI sequence.

A processor of a wireless device (e.g., controlling the receiver 710, the transmitter 715, or the transceiver 915 as described with reference to FIG. 9) may increase available battery power and communication quality. The increased communication quality may increase available battery power and throughput (e.g., via implementation of system components described with reference to FIG. 8) compared to other systems and techniques, for example, that do not support configuration of a respective GI duration for each TRP in a multi-TRP communication scenario. Further, the processor of the wireless device may identify a respective GI duration for each TRP, which may result in increased communication quality, as well as save power and increase battery life at the wireless device (e.g., by strategically supporting a higher communication quality based on the configured GIs), among other benefits.

In some cases, the GI indication component 725 and the signal reception component 730 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the GI indication component 725 and the signal reception component 730 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
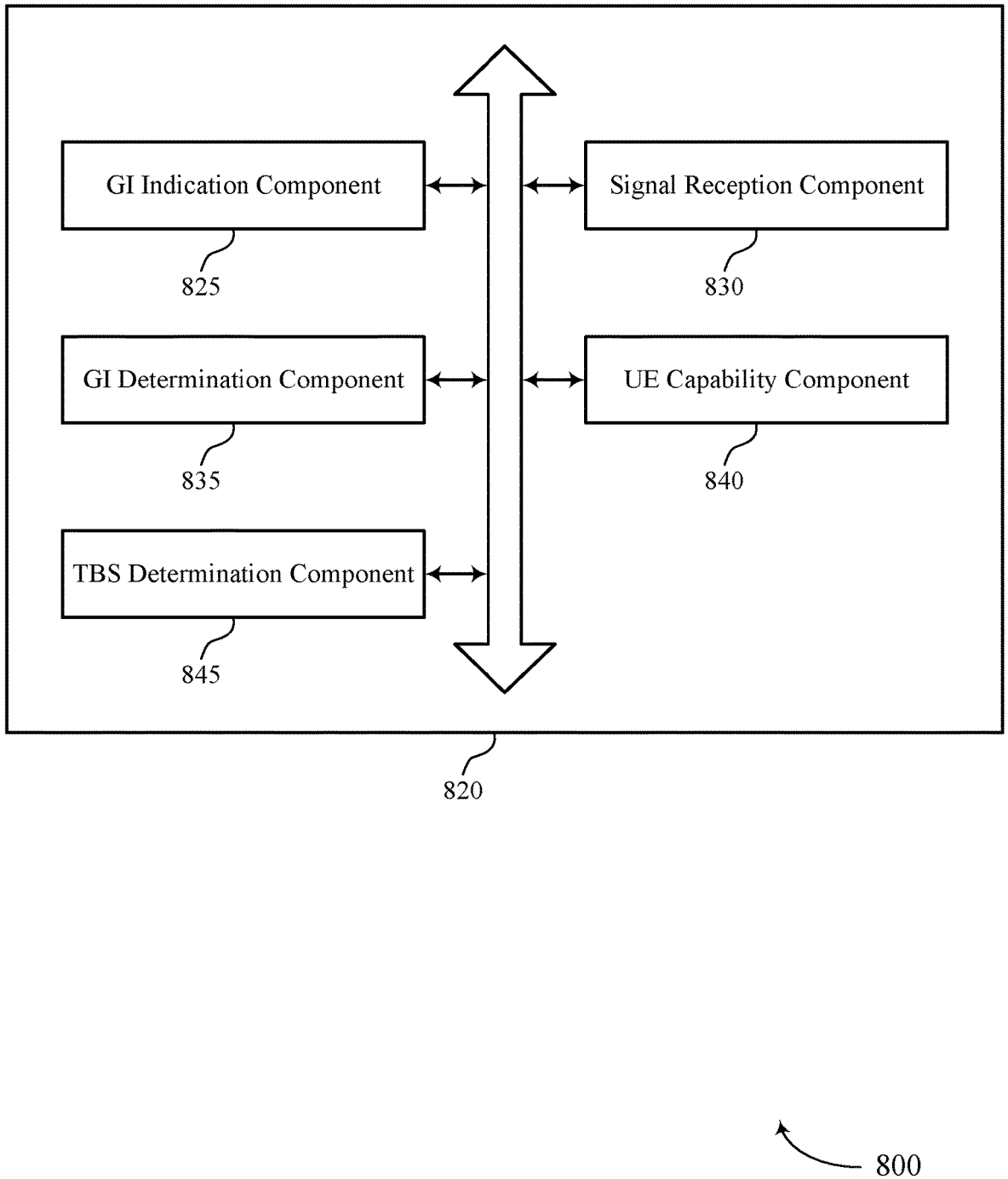
FIG. 8 shows a block diagram of a communications manager that supports GI configurations for multiple links in accordance with aspects of the present disclosure.

FIG. 8 shows a block diagram 800 of a communications manager 820 that supports GI configurations for multiple links in accordance with aspects of the present disclosure.

The communications manager 820 may be an example of aspects of a communications manager 620, a communications manager 720, or both, as described herein. The communications manager 820, or various components thereof, may be an example of means for performing various aspects of GI configurations for multiple links as described herein. For example, the communications manager 820 may include a GI indication component 825, a signal reception component 830, a GI determination component 835, a UE capability component 840, a TBS determination component 845, or any combination thereof. Each of these components may communicate, directly or indirectly, with one another (e.g., via one or more buses).

The communications manager 820 may support wireless communication at a UE in accordance with examples as disclosed herein. The GI indication component 825 may be configured as or otherwise support a means for transmitting an indication of a first GI duration for downlink signals from a first TRP and a second GI duration for downlink signals from a second TRP. The signal reception component 830 may be configured as or otherwise support a means for communicating with the first TRP during a first set of multiple symbol periods, each symbol period of the first set of multiple symbol periods including a first portion that includes a first information symbol and a second portion that has the first GI duration and includes at least a part of a GI sequence. In some examples, the signal reception component 830 may be configured as or otherwise support a means for communicating with the second TRP during a second set of multiple symbol periods, each symbol period of the second set of multiple symbol periods including a first portion that includes a second information symbol and a second portion that has the second GI duration and includes at least a part of the GI sequence.

In some examples, the GI determination component 835 may be configured as or otherwise support a means for determining the first GI duration and the second GI duration based on a timing difference between signaling from the first TRP and signaling from the second TRP, where transmitting the indication of the first GI duration and the second GI duration is based on the determining.

In some examples, to support transmitting the indication of the first GI duration and the second GI duration, the GI indication component 825 may be configured as or otherwise support a means for transmitting a first indication identifying a first TCI state, a first TCI state group, a first CORESET pool index, or any combination thereof, associated with the first TRP and the first GI duration. In some examples, to support transmitting the indication of the first GI duration and the second GI duration, the GI indication component 825 may be configured as or otherwise support a means for transmitting a second indication identifying a second TCI state, a second TCI state group, a second CORESET pool index, or any combination thereof, associated with the second TRP and the second GI duration.

In some examples, the signal reception component 830 may be configured as or otherwise support a means for performing, within a same time period, a signal processing operation on the first portion of a first symbol period of the first set of multiple symbol periods and on the first portion of a second symbol period of the second set of multiple symbol periods.

In some examples, the GI determination component 835 may be configured as or otherwise support a means for identifying a first signal delay for the first TRP and a second signal delay for the second TRP. In some examples, the GI determination component 835 may be configured as or otherwise support a means for selecting a same duration for the first GI duration and the second GI duration based on a largest signal delay of the first signal delay and the second signal delay, where the indication of the first GI duration and the second GI duration includes the selected same duration. In some examples, the UE communicates with the first TRP and the second TRP according to a TDM scheme or using an SFN.

In some examples, the UE capability component 840 may be configured as or otherwise support a means for transmitting an indication of a time period associated with a capability of the UE to change a GI duration. In some examples, the TBS determination component 845 may be configured as or otherwise support a means for determining a TBS for the first TRP, the second TRP, or both, according to the time period and based on the first GI duration and the second GI duration.

In some examples, the TBS determination component 845 may be configured as or otherwise support a means for determining a first quantity of unquantized information bits of a TB corresponding to the first TRP and a second quantity of unquantized information bits of a TB corresponding to the second TRP. In some examples, the TBS determination component 845 may be configured as or otherwise support a means for determining a TBS applicable to the first TRP and the second TRP based on a sum of the first quantity of unquantized information bits and the second quantity of unquantized information bits.

In some examples, a first RB associated with the first TRP and a second RB associated with the second TRP include a same number of usable time domain REs. In some examples, a first transmission layer associated with the first TRP and a second transmission layer associated with the second TRP include a same number of usable time domain REs.

In some cases, the GI indication component 825, the signal reception component 830, the GI determination component 835, the UE capability component 840, and the TBS determination component 845 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the GI indication component 825, the signal reception component 830, the GI determination component 835, the UE capability component 840, and the TBS determination component 845 discussed herein.

Figure 9:
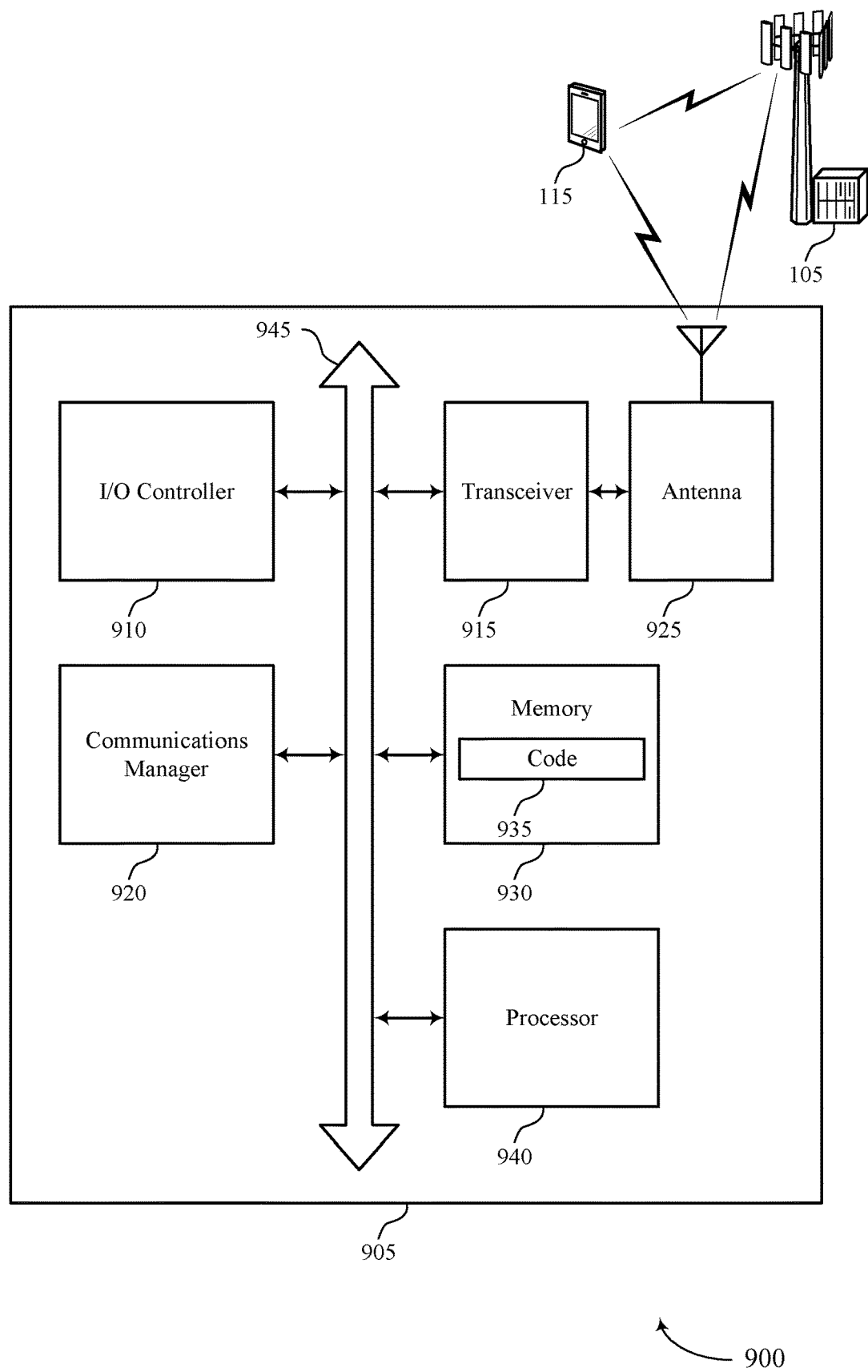
FIG. 9 shows a diagram of a system including a device that supports GI configurations for multiple links in accordance with aspects of the present disclosure.

FIG. 9 shows a diagram of a system 900 including a device 905 that supports GI configurations for multiple links in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting GI configurations for multiple links). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting an indication of a first GI duration for downlink signals from a first TRP and a second GI duration for downlink signals from a second TRP. The communications manager 920 may be configured as or otherwise support a means for communicating with the first TRP during a first set of multiple symbol periods, each symbol period of the first set of multiple symbol periods including a first portion that includes a first information symbol and a second portion that has the first GI duration and includes at least a part of a GI sequence. The communications manager 920 may be configured as or otherwise support a means for communicating with the second TRP during a second set of multiple symbol periods, each symbol period of the second set of multiple symbol periods including a first portion that includes a second information symbol and a second portion that has the second GI duration and includes at least a part of the GI sequence.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of GI configurations for multiple links as described herein, or the processor 940 and the memory 930 may be otherwise configured to perform or support such operations.

Figure 10:
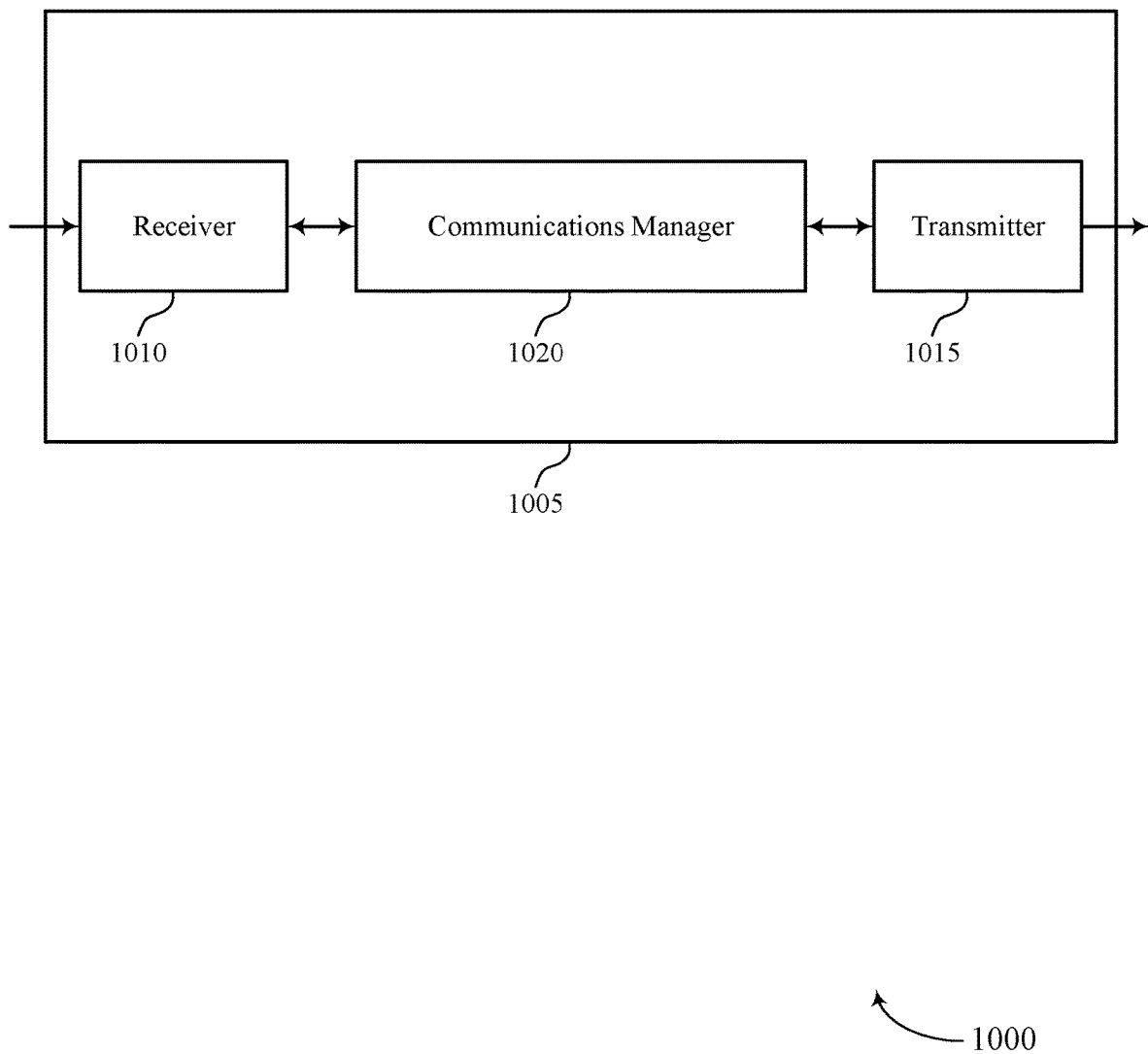
FIGS. 10 and 11 show block diagrams of devices that support GI configurations for multiple links in accordance with aspects of the present disclosure.

FIG. 10 shows a block diagram 1000 of a device 1005 that supports GI configurations for multiple links in accordance with aspects of the present disclosure. The device 1005 may be an example of aspects of a base station 105 as described herein. The device 1005 may include a receiver 1010, a transmitter 1015, and a communications manager 1020. The device 1005 may also include one or more processors, memory coupled with the one or more processors, and instructions stored in the memory that are executable by the one or more processors to enable the one or more processors to configure GI configurations for multiple links discussed herein. Each of these components may be in communication with one another (e.g., via one or more buses).

The receiver 1010 may provide a means for receiving information such as packets, user data, control information, or any combination thereof associated with various information channels (e.g., control channels, data channels, information channels related to GI configurations for multiple links). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to GI configurations for multiple links). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of GI configurations for multiple links as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for receiving, from a UE, an indication of a first GI duration for downlink signals from a first TRP and a second GI duration for downlink signals from a second TRP. The communications manager 1020 may be configured as or otherwise support a means for communicating with the UE via at least the first TRP during a first set of multiple symbol periods, each symbol period of the first set of multiple symbol periods including a first portion that includes a first information symbol and a second portion that has the first GI duration and includes at least a part of a GI sequence.

Figure 11:
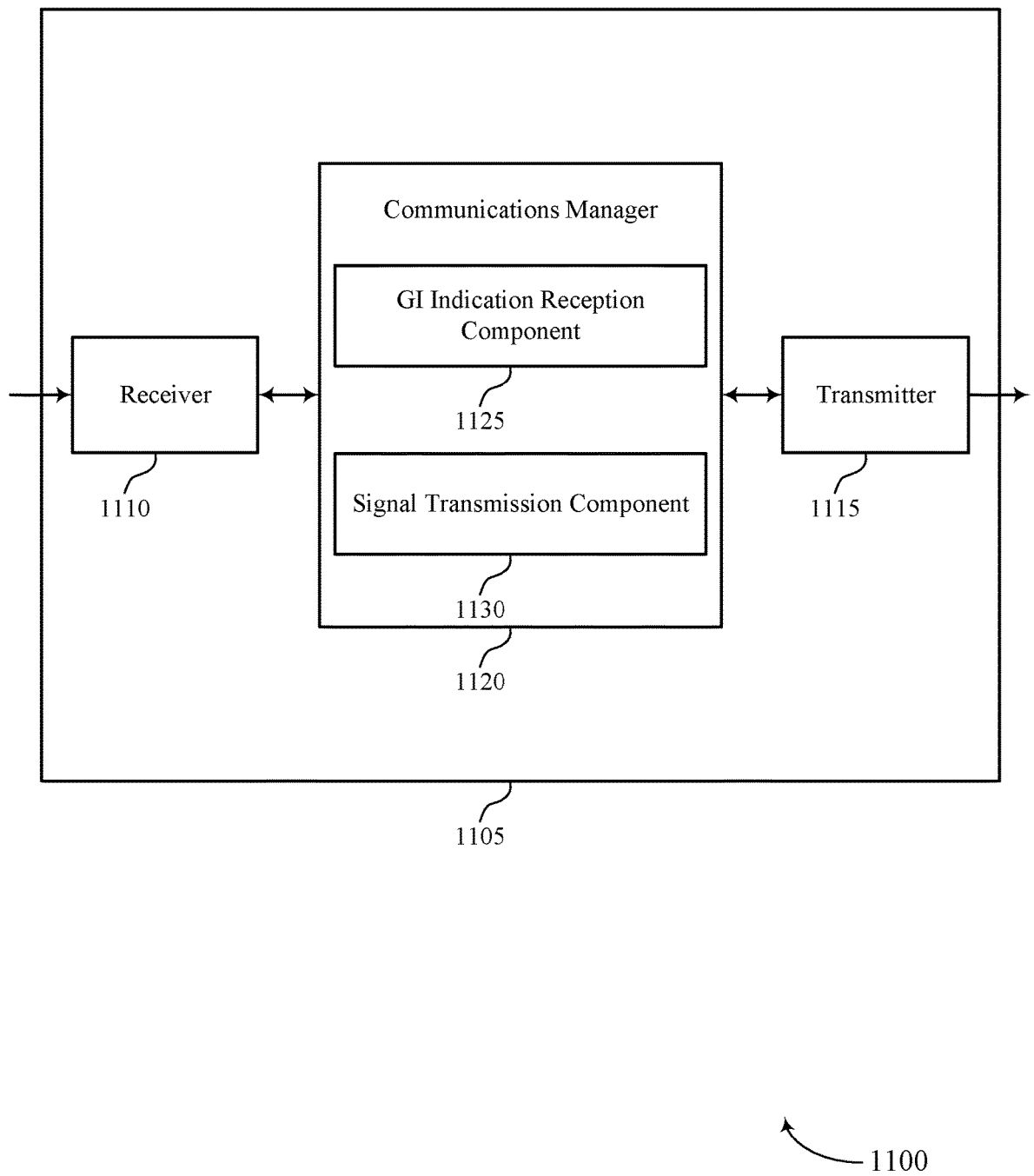

FIG. 11 shows a block diagram 1100 of a device 1105 that supports GI configurations for multiple links in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to GI configurations for multiple links). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to GI configurations for multiple links). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of GI configurations for multiple links as described herein. For example, the communications manager 1120 may include a GI indication reception component 1125 a signal transmission component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The GI indication reception component 1125 may be configured as or otherwise support a means for receiving, from a UE, an indication of a first GI duration for downlink signals from a first TRP and a second GI duration for downlink signals from a second TRP. The signal transmission component 1130 may be configured as or otherwise support a means for communicating with the UE via at least the first TRP during a first set of multiple symbol periods, each symbol period of the first set of multiple symbol periods including a first portion that includes a first information symbol and a second portion that has the first GI duration and includes at least a part of a GI sequence.

In some cases, the GI indication reception component 1125 and the signal transmission component 1130 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the GI indication reception component 1125 and the signal transmission component 1130 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 12:
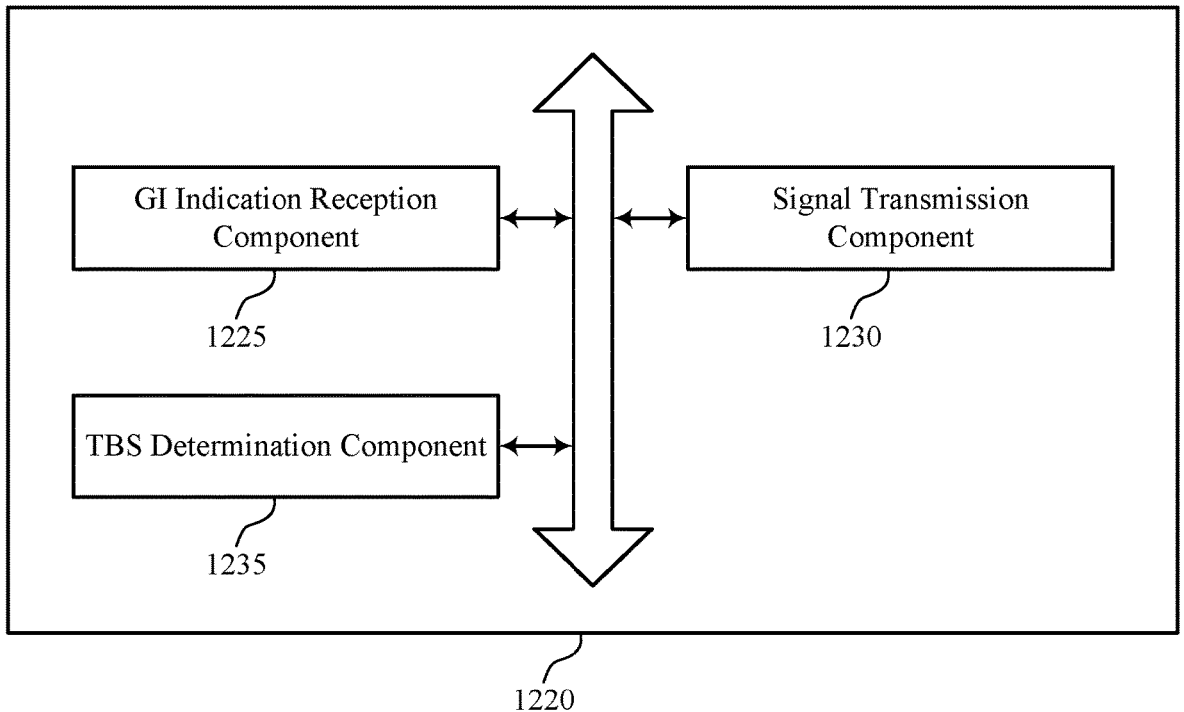
FIG. 12 shows a block diagram of a communications manager that supports GI configurations for multiple links in accordance with aspects of the present disclosure.

FIG. 12 shows a block diagram 1200 of a communications manager 1220 that supports GI configurations for multiple links in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of GI configurations for multiple links as described herein. For example, the communications manager 1220 may include a GI indication reception component 1225, a signal transmission component 1230, a TBS determination component 1235, or any combination thereof. Each of these components may communicate, directly or indirectly, with one another (e.g., via one or more buses).

The communications manager 1220 may support wireless communication at a base station in accordance with examples as disclosed herein. The GI indication reception component 1225 may be configured as or otherwise support a means for receiving, from a UE, an indication of a first GI duration for downlink signals from a first TRP and a second GI duration for downlink signals from a second TRP. The signal transmission component 1230 may be configured as or otherwise support a means for communicating with the UE via at least the first TRP during a first set of multiple symbol periods, each symbol period of the first set of multiple symbol periods including a first portion that includes a first information symbol and a second portion that has the first GI duration and includes at least a part of a GI sequence.

In some examples, the signal transmission component 1230 may be configured as or otherwise support a means for communicating with the UE via the second TRP during a second set of multiple symbol periods, each symbol period of the second set of multiple symbol periods including a first portion that includes a second information symbol and a second portion that has the second GI duration and includes at least a part of the GI sequence.

In some examples, the first GI duration and the second GI duration correspond to a timing difference between signaling from the first TRP to the UE and signaling from the second TRP to the UE.

In some examples, to support receiving the indication of the first GI duration and the second GI duration, the GI indication reception component 1225 may be configured as or otherwise support a means for receiving a first indication identifying a first TCI state, a first TCI state group, a first CORESET pool index, or any combination thereof, associated with the first TRP and the first GI duration. In some examples, to support receiving the indication of the first GI duration and the second GI duration, the GI indication reception component 1225 may be configured as or otherwise support a means for receiving a second indication identifying a second TCI state or a second CORESET pool index, or any combination thereof, associated with the second TRP and the second GI duration.

In some examples, to support receiving the indication of the first GI duration and the second GI duration, the GI indication reception component 1225 may be configured as or otherwise support a means for receiving an indication of a same duration for the first GI duration and the second GI duration, where the same duration for the first GI duration and the second GI duration corresponds to a largest signal delay of a first signal delay for signaling from the first TRP to the UE and a second signal delay for signaling from the second TRP to the UE. In some examples, the communicating with the UE takes place according to a TDM scheme or using an SFN.

In some examples, the GI indication reception component 1225 may be configured as or otherwise support a means for receiving an indication of a time period associated with a capability of the UE to change a GI duration. In some examples, the TBS determination component 1235 may be configured as or otherwise support a means for determining a TBS for the first TRP according to the time period and based on the first GI duration and the second GI duration.

In some examples, the TBS determination component 1235 may be configured as or otherwise support a means for determining a first quantity of unquantized information bits of a TB corresponding to the first TRP and a second quantity of unquantized information bits of a TB corresponding to the second TRP. In some examples, the TBS determination component 1235 may be configured as or otherwise support a means for determining a TBS applicable to the first TRP and the second TRP based on a sum of the first quantity of unquantized information bits and the second quantity of unquantized information bits.

In some examples, a first RB associated with the first TRP and a second RB associated with the second TRP include a same number of usable time domain REs. In some examples, a first transmission layer associated with the first TRP and a second transmission layer associated with the second TRP include a same number of usable time domain REs.

In some cases, the GI indication reception component 1225, the signal transmission component 1230, and the TBS determination component 1235 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the GI indication reception component 1225, the signal transmission component 1230, and the TBS determination component 1235 discussed herein.

Figure 13:
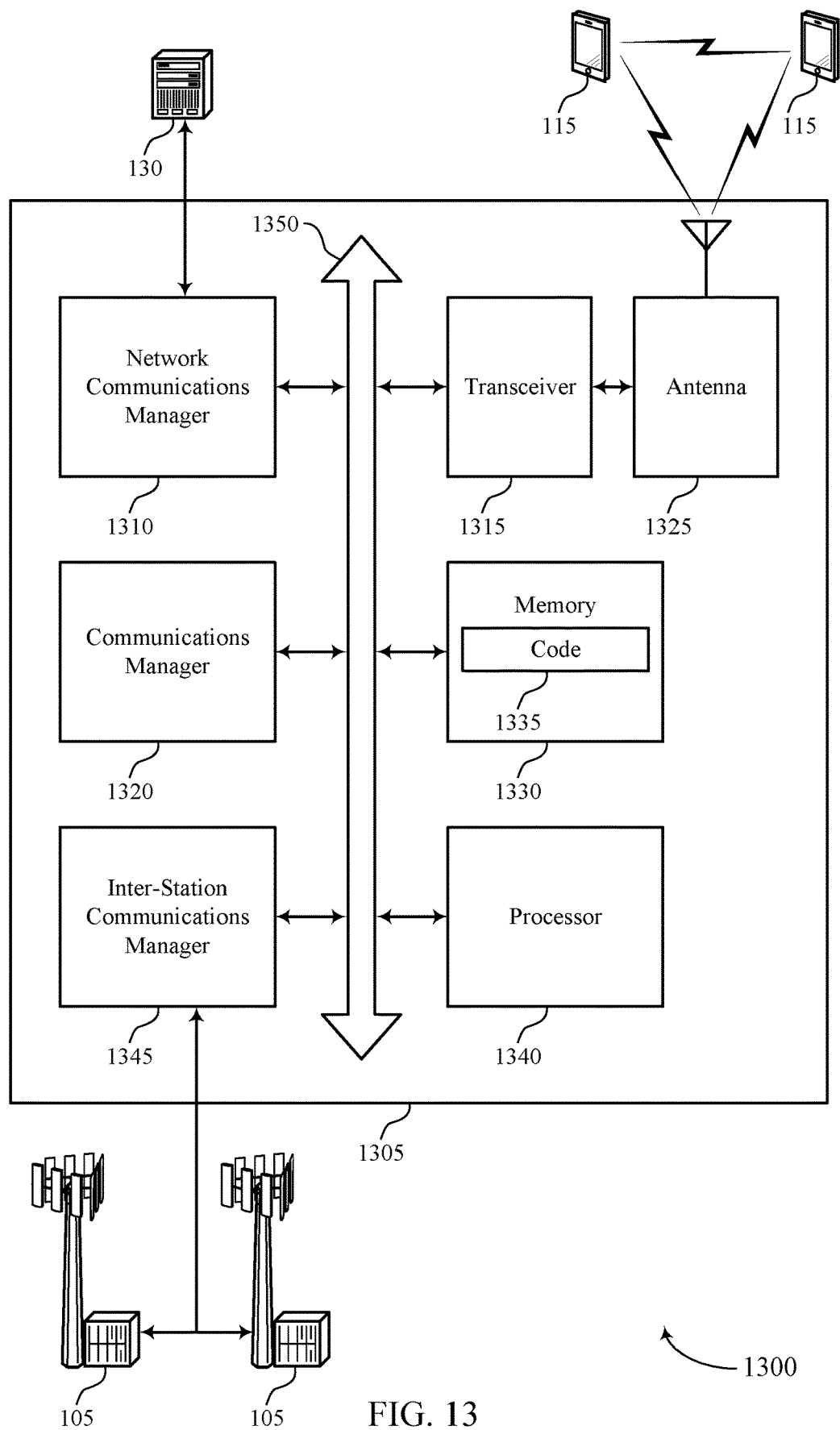
FIG. 13 shows a diagram of a system including a device that supports GI configurations for multiple links in accordance with aspects of the present disclosure.

FIG. 13 shows a diagram of a system 1300 including a device 1305 that supports GI configurations for multiple links in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting GI configurations for multiple links). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for receiving, from a UE, an indication of a first GI duration for downlink signals from a first TRP and a second GI duration for downlink signals from a second TRP. The communications manager 1320 may be configured as or otherwise support a means for communicating with the UE via at least the first TRP during a first set of multiple symbol periods, each symbol period of the first set of multiple symbol periods including a first portion that includes a first information symbol and a second portion that has the first GI duration and includes at least a part of a GI sequence.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of GI configurations for multiple links as described herein, or the processor 1340 and the memory 1330 may be otherwise configured to perform or support such operations.

Figure 14:
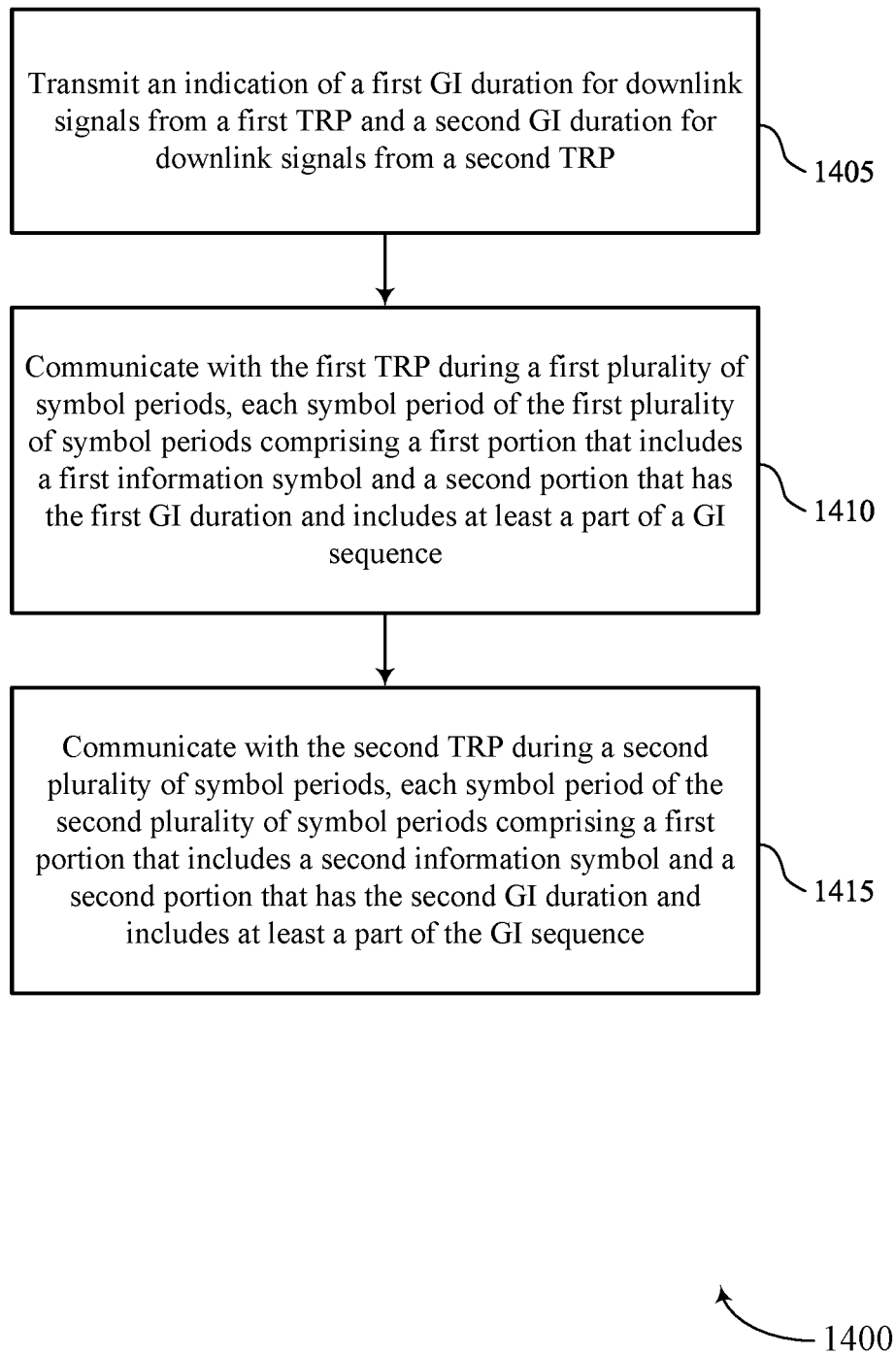
FIGS. 14 through 17 show flowcharts illustrating methods that support GI configurations for multiple links in accordance with aspects of the present disclosure.

FIG. 14 shows a flowchart illustrating a method 1400 that supports GI configurations for multiple links in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include transmitting an indication of a first GI duration for downlink signals from a first TRP and a second GI duration for downlink signals from a second TRP. The operations of 1405 may be performed in accordance with examples as disclosed herein. In some examples, aspects of the operations of 1405 may be performed by a GI indication component 825 as described with reference to FIG. 8.

At 1410, the method may include communicating with the first TRP during a first set of multiple symbol periods, each symbol period of the first set of multiple symbol periods including a first portion that includes a first information symbol and a second portion that has the first GI duration and includes at least a part of a GI sequence. The operations of 1410 may be performed in accordance with examples as disclosed herein. In some examples, aspects of the operations of 1410 may be performed by a signal reception component 830 as described with reference to FIG. 8.

At 1415, the method may include communicating with the second TRP during a second set of multiple symbol periods, each symbol period of the second set of multiple symbol periods including a first portion that includes a second information symbol and a second portion that has the second GI duration and includes at least a part of the GI sequence. The operations of 1415 may be performed in accordance with examples as disclosed herein. In some examples, aspects of the operations of 1415 may be performed by a signal reception component 830 as described with reference to FIG. 8.

Figure 15:
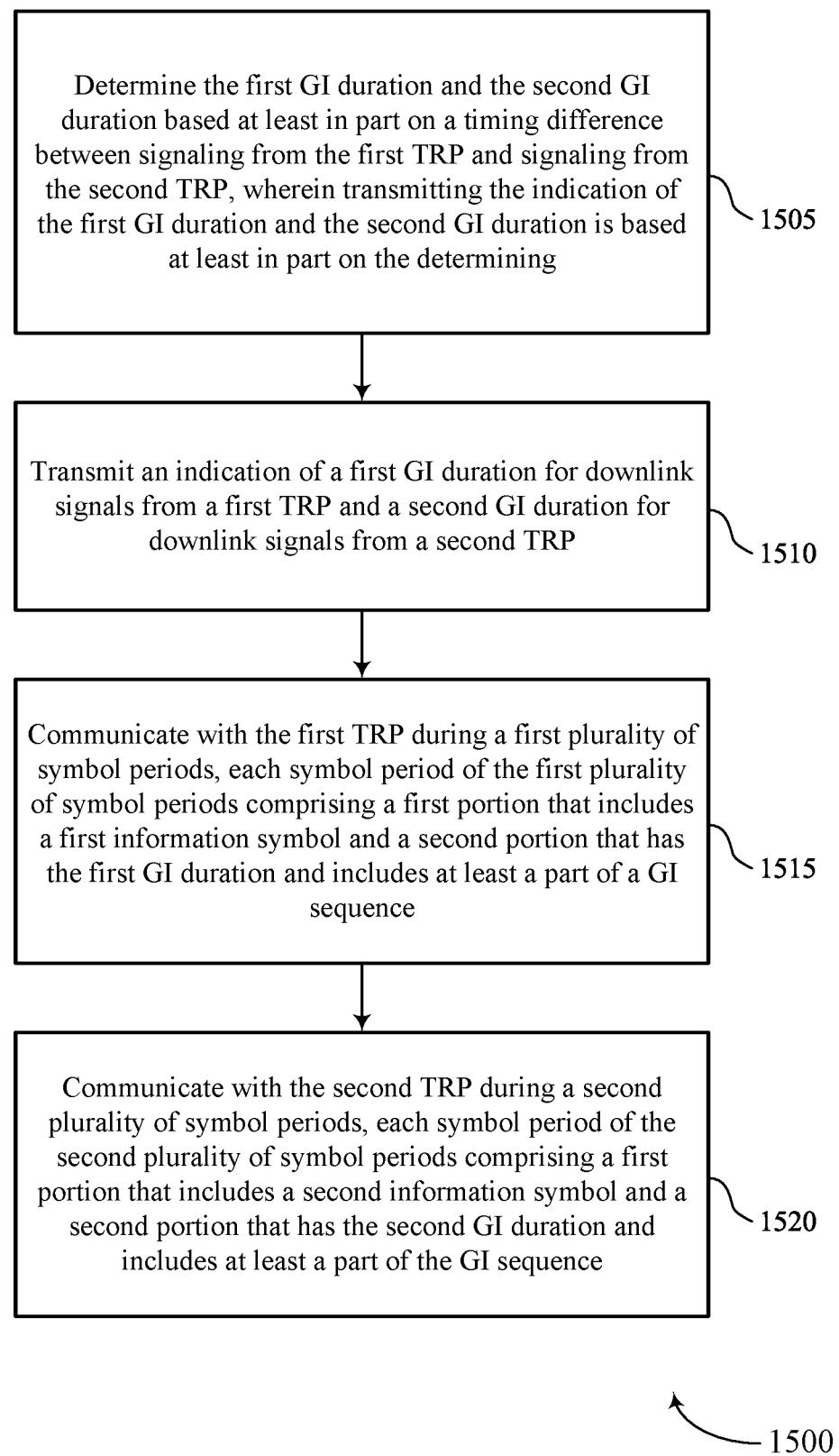

FIG. 15 shows a flowchart illustrating a method 1500 that supports GI configurations for multiple links in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include determining the first GI duration and the second GI duration based on a timing difference between signaling from the first TRP and signaling from the second TRP, where transmitting the indication of the first GI duration and the second GI duration is based on the determining. The operations of 1505 may be performed in accordance with examples as disclosed herein. In some examples, aspects of the operations of 1505 may be performed by a GI determination component 835 as described with reference to FIG. 8.

At 1510, the method may include transmitting an indication of a first GI duration for downlink signals from a first TRP and a second GI duration for downlink signals from a second TRP. The operations of 1510 may be performed in accordance with examples as disclosed herein. In some examples, aspects of the operations of 1510 may be performed by a GI indication component 825 as described with reference to FIG. 8.

At 1515, the method may include communicating with the first TRP during a first set of multiple symbol periods, each symbol period of the first set of multiple symbol periods including a first portion that includes a first information symbol and a second portion that has the first GI duration and includes at least a part of a GI sequence. The operations of 1515 may be performed in accordance with examples as disclosed herein. In some examples, aspects of the operations of 1515 may be performed by a signal reception component 830 as described with reference to FIG. 8.

At 1520, the method may include communicating with the second TRP during a second set of multiple symbol periods, each symbol period of the second set of multiple symbol periods including a first portion that includes a second information symbol and a second portion that has the second GI duration and includes at least a part of the GI sequence. The operations of 1520 may be performed in accordance with examples as disclosed herein. In some examples, aspects of the operations of 1520 may be performed by a signal reception component 830 as described with reference to FIG. 8.

Figure 16:
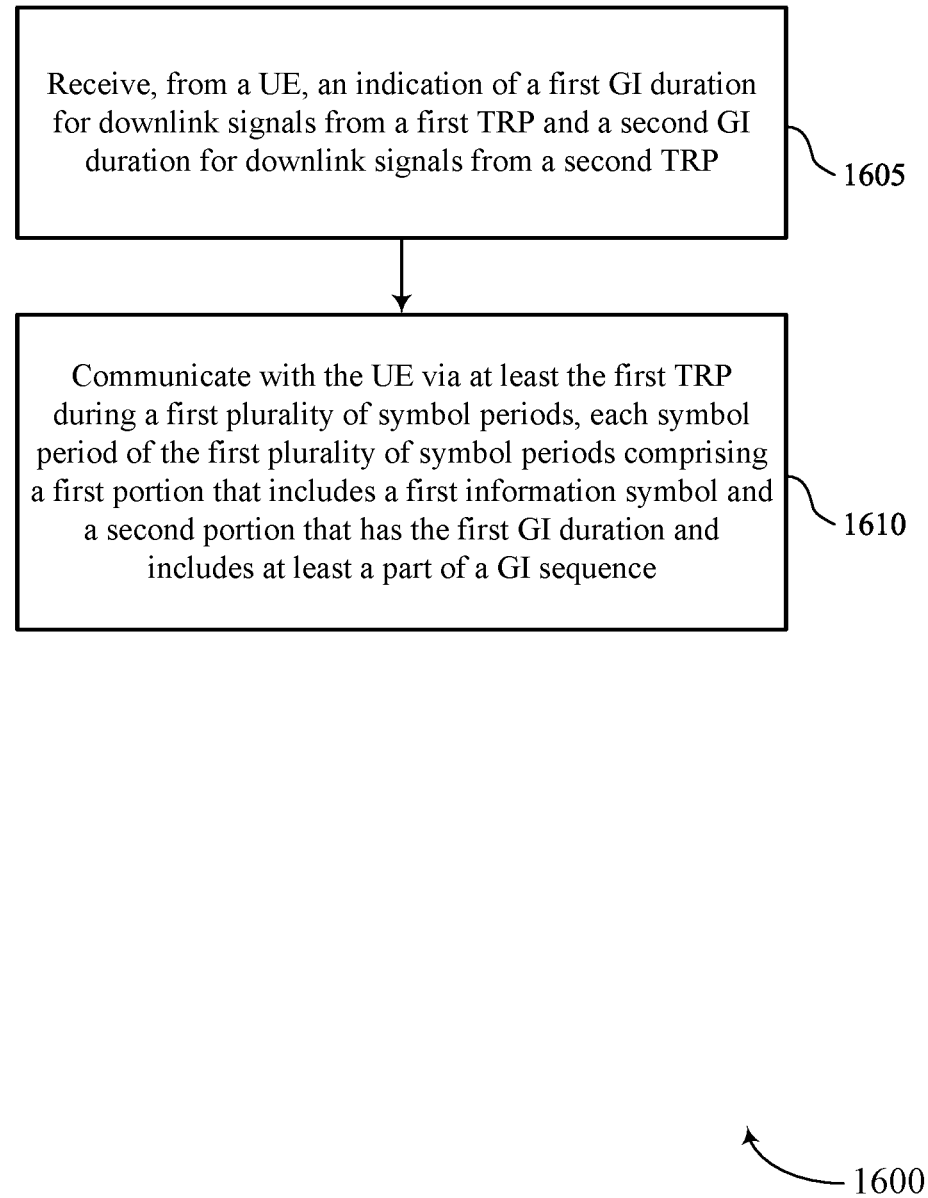

FIG. 16 shows a flowchart illustrating a method 1600 that supports GI configurations for multiple links in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, an indication of a first GI duration for downlink signals from a first TRP and a second GI duration for downlink signals from a second TRP. The operations of 1605 may be performed in accordance with examples as disclosed herein. In some examples, aspects of the operations of 1605 may be performed by a GI indication reception component 1225 as described with reference to FIG. 12.

At 1610, the method may include communicating with the UE via at least the first TRP during a first set of multiple symbol periods, each symbol period of the first set of multiple symbol periods including a first portion that includes a first information symbol and a second portion that has the first GI duration and includes at least a part of a GI sequence. The operations of 1610 may be performed in accordance with examples as disclosed herein. In some examples, aspects of the operations of 1610 may be performed by a signal transmission component 1230 as described with reference to FIG. 12.

Figure 17:
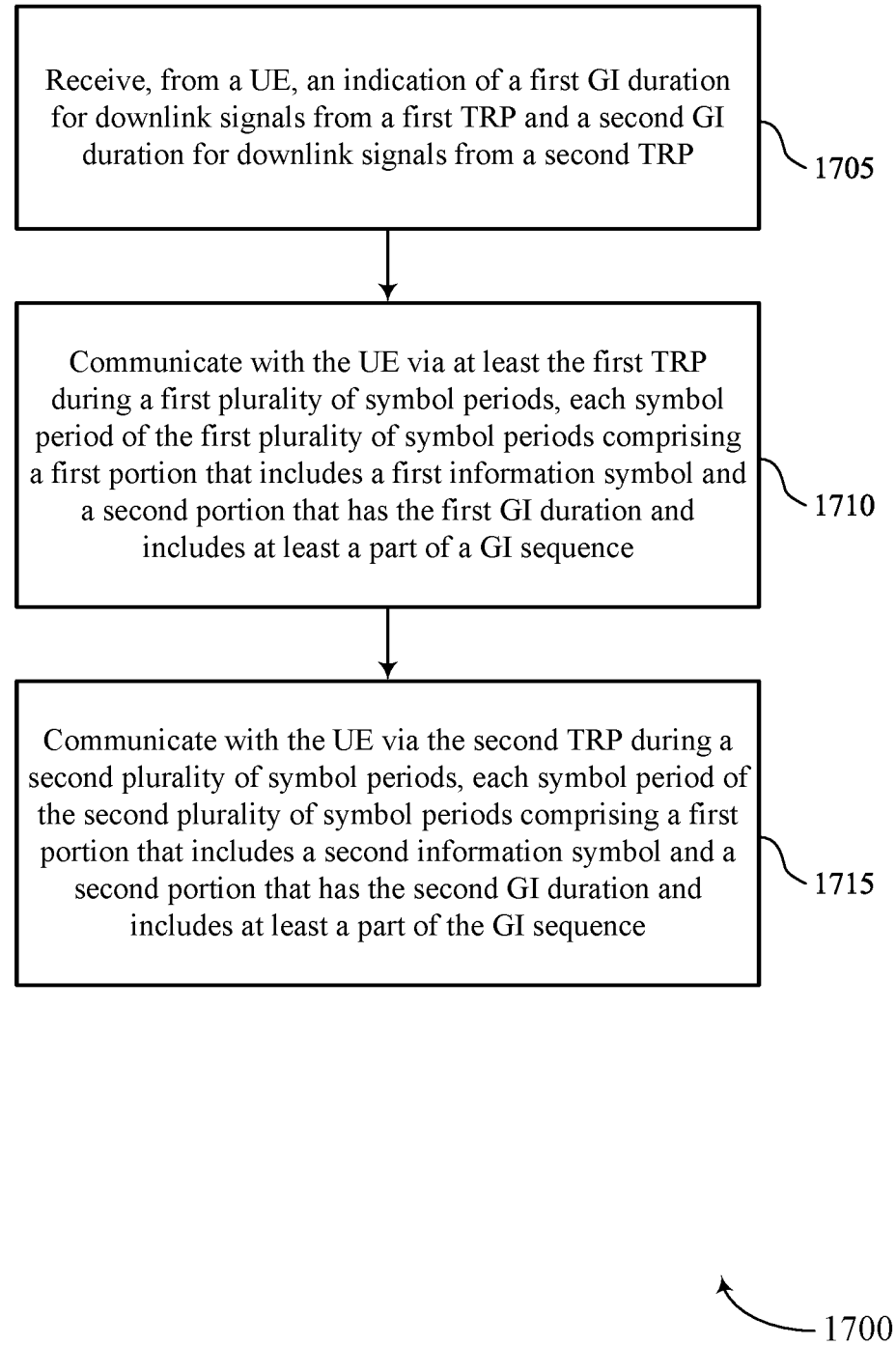

FIG. 17 shows a flowchart illustrating a method 1700 that supports GI configurations for multiple links in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, an indication of a first GI duration for downlink signals from a first TRP and a second GI duration for downlink signals from a second TRP. The operations of 1705 may be performed in accordance with examples as disclosed herein. In some examples, aspects of the operations of 1705 may be performed by a GI indication reception component 1225 as described with reference to FIG. 12.

At 1710, the method may include communicating with the UE via at least the first TRP during a first set of multiple symbol periods, each symbol period of the first set of multiple symbol periods including a first portion that includes a first information symbol and a second portion that has the first GI duration and includes at least a part of a GI sequence. The operations of 1710 may be performed in accordance with examples as disclosed herein. In some examples, aspects of the operations of 1710 may be performed by a signal transmission component 1230 as described with reference to FIG. 12.

At 1715, the method may include communicating with the UE via the second TRP during a second set of multiple symbol periods, each symbol period of the second set of multiple symbol periods including a first portion that includes a second information symbol and a second portion that has the second GI duration and includes at least a part of the GI sequence. The operations of 1715 may be performed in accordance with examples as disclosed herein. In some examples, aspects of the operations of 1715 may be performed by a signal transmission component 1230 as described with reference to FIG. 12.

The following provides an overview of aspects of the present disclosure:

Aspect 1: A method for wireless communication at a UE, comprising: transmitting an indication of a first GI duration for downlink signals from a first TRP and a second GI duration for downlink signals from a second TRP; communicating with the first TRP during a first plurality of symbol periods, each symbol period of the first plurality of symbol periods comprising a first portion that includes a first information symbol and a second portion that has the first GI duration and includes at least a part of a GI sequence; and communicating with the second TRP during a second plurality of symbol periods, each symbol period of the second plurality of symbol periods comprising a first portion that includes a second information symbol and a second portion that has the second GI duration and includes at least a part of the GI sequence.

Aspect 2: The method of aspect 1, further comprising: determining the first GI duration and the second GI duration based at least in part on a timing difference between signaling from the first TRP and signaling from the second TRP, wherein transmitting the indication of the first GI duration and the second GI duration is based at least in part on the determining.

Aspect 3: The method of any of aspects 1 through 2, wherein transmitting the indication of the first GI duration and the second GI duration comprises: transmitting a first indication identifying a first TCI state, a first TCI state group, a first CORESET pool index, or any combination thereof, associated with the first TRP and the first GI duration; and transmitting a second indication identifying a second TCI state, a second TCI state group, a second CORESET pool index, or any combination thereof, associated with the second TRP and the second GI duration.

Aspect 4: The method of any of aspects 1 through 3, further comprising: performing, within a same time period, a signal processing operation on the first portion of a first symbol period of the first plurality of symbol periods and on the first portion of a second symbol period of the second plurality of symbol periods.

Aspect 5: The method of any of aspects 1 through 4, further comprising: identifying a first signal delay for the first TRP and a second signal delay for the second TRP; and selecting a same duration for the first GI duration and the second GI duration based at least in part on a largest signal delay of the first signal delay and the second signal delay, wherein the indication of the first GI duration and the second GI duration comprises the selected same duration.

Aspect 6: The method of aspect 5, wherein the UE communicates with the first TRP and the second TRP according to a TDM scheme or using a SFN.

Aspect 7: The method of any of aspects 1 through 6, further comprising: transmitting an indication of a time period associated with a capability of the UE to change a GI duration; and determining a TBS for the first TRP, the second TRP, or both, according to the time period and based at least in part on the first GI duration and the second GI duration.

Aspect 8: The method of any of aspects 1 through 7, further comprising: determining a first quantity of unquantized information bits of a TB corresponding to the first TRP and a second quantity of unquantized information bits of a TB corresponding to the second TRP; and determining a TBS applicable to the first TRP and the second TRP based at least in part on a sum of the first quantity of unquantized information bits and the second quantity of unquantized information bits.

Aspect 9: The method of aspect 8, wherein a first RB associated with the first TRP and a second RB associated with the second TRP comprise a same number of usable time domain REs.

Aspect 10: The method of any of aspects 8 through 9, wherein a first transmission layer associated with the first TRP and a second transmission layer associated with the second TRP comprise a same number of usable time domain REs.

Aspect 11: A method for wireless communication at a base station, comprising: receiving, from a UE, an indication of a first GI duration for downlink signals from a first TRP and a second GI duration for downlink signals from a second TRP; and communicating with the UE via at least the first TRP during a first plurality of symbol periods, each symbol period of the first plurality of symbol periods comprising a first portion that includes a first information symbol and a second portion that has the first GI duration and includes at least a part of a GI sequence.

Aspect 12: The method of aspect 11, further comprising: communicating with the UE via the second TRP during a second plurality of symbol periods, each symbol period of the second plurality of symbol periods comprising a first portion that includes a second information symbol and a second portion that has the second GI duration and includes at least a part of the GI sequence.

Aspect 13: The method of any of aspects 11 through 12, wherein the first GI duration and the second GI duration correspond to a timing difference between signaling from the first TRP to the UE and signaling from the second TRP to the UE.

Aspect 14: The method of any of aspects 11 through 13, wherein receiving the indication of the first GI duration and the second GI duration comprises: receiving a first indication identifying a first TCI state, a first TCI state group, a first CORESET pool index, or any combination thereof, associated with the first TRP and the first GI duration; and receiving a second indication identifying a second TCI state or a second CORESET pool index, or any combination thereof, associated with the second TRP and the second GI duration.

Aspect 15: The method of any of aspects 11 through 14, wherein receiving the indication of the first GI duration and the second GI duration comprises: receiving an indication of a same duration for the first GI duration and the second GI duration, wherein the same duration for the first GI duration and the second GI duration corresponds to a largest signal delay of a first signal delay for signaling from the first TRP to the UE and a second signal delay for signaling from the second TRP to the UE.

Aspect 16: The method of aspect 15, wherein the communicating with the UE takes place according to a TDM scheme or using a SFN.

Aspect 17: The method of any of aspects 11 through 16, further comprising: receiving an indication of a time period associated with a capability of the UE to change a GI duration; and determining a TBS for the first TRP according to the time period and based at least in part on the first GI duration and the second GI duration.

Aspect 18: The method of any of aspects 11 through 17, further comprising: determining a first quantity of unquantized information bits of a TB corresponding to the first TRP and a second quantity of unquantized information bits of a TB corresponding to the second TRP; and determining a TBS applicable to the first TRP and the second TRP based at least in part on a sum of the first quantity of unquantized information bits and the second quantity of unquantized information bits.

Aspect 19: The method of aspect 18, wherein a first RB associated with the first TRP and a second RB associated with the second TRP comprise a same number of usable time domain REs.

Aspect 20: The method of any of aspects 18 through 19, wherein a first transmission layer associated with the first TRP and a second transmission layer associated with the second TRP comprise a same number of usable time domain REs.

Aspect 21: An apparatus for wireless communication at a UE, comprising a processor; memory coupled with the processor; and instructions stored in the memory and executable by the processor to cause the apparatus to perform a method of any of aspects 1 through 10.

Aspect 22: An apparatus for wireless communication at a UE, comprising at least one means for performing a method of any of aspects 1 through 10.

Aspect 23: A non-transitory computer-readable medium storing code for wireless communication at a UE, the code comprising instructions executable by a processor to perform a method of any of aspects 1 through 10.

Aspect 24: An apparatus for wireless communication at a base station, comprising a processor; memory coupled with the processor; and instructions stored in the memory and executable by the processor to cause the apparatus to perform a method of any of aspects 11 through 20.

Aspect 25: An apparatus for wireless communication at a base station, comprising at least one means for performing a method of any of aspects 11 through 20.

Aspect 26: A non-transitory computer-readable medium storing code for wireless communication at a base station, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting an indication of a first guard interval duration for downlink signals from a first transmission reception point and a second guard interval duration for downlink signals from a second transmission reception point;
   communicating with the first transmission reception point during a plurality of first symbol periods, each first symbol period of the plurality of first symbol periods comprising a first portion of a first symbol period that includes a first information symbol and a second portion of the first symbol period, after the first portion of the first symbol period, that has the first guard interval duration and includes at least a part of a guard interval sequence; and
   communicating with the second transmission reception point during a plurality of second symbol periods, each second symbol period of the plurality of second symbol periods comprising a first portion of a second symbol period that includes a second information symbol and a second portion of the second symbol period, after the first portion of the first symbol period, that has the second guard interval duration and includes at least a part of the guard interval sequence.

2. The method of claim 1, further comprising:
   determining the first guard interval duration and the second guard interval duration based at least in part on a timing difference between signaling from the first transmission reception point and signaling from the second transmission reception point, wherein transmitting the indication of the first guard interval duration and the second guard interval duration is based at least in part on the determining.

3. The method of claim 1, wherein transmitting the indication of the first guard interval duration and the second guard interval duration comprises:
   transmitting a first indication identifying a first transmission configuration indicator state, a first transmission configuration indicator state group, a first control resource set pool index, or any combination thereof, associated with the first transmission reception point and the first guard interval duration; and transmitting a second indication identifying a second transmission configuration indicator state, a second transmission configuration indicator state group, a second control resource set pool index, or any combination thereof, associated with the second transmission reception point and the second guard interval duration.

4. The method of claim 1, further comprising:

performing, within a same time period, a signal processing operation on the first portion of the first symbol period of the plurality of first symbol periods and on the first portion of the second symbol period of the plurality of second symbol periods.

5. The method of claim 1, further comprising:

identifying a first signal delay for the first transmission reception point and a second signal delay for the second transmission reception point; and selecting a same duration for the first guard interval duration and the second guard interval duration based at least in part on a largest signal delay of the first signal delay and the second signal delay, wherein the indication of the first guard interval duration and the second guard interval duration comprises the selected same duration.

6. The method of claim 5, wherein the UE communicates with the first transmission reception point and the second transmission reception point according to a time division multiplexing scheme or using a single frequency network.

7. The method of claim 1, further comprising:

transmitting an indication of a time period associated with a capability of the UE to change a guard interval duration; and determining a transport block size for the first transmission reception point, the second transmission reception point, or both, according to the time period and based at least in part on the first guard interval duration and the second guard interval duration.

8. The method of claim 1, further comprising:

determining a first quantity of unquantized information bits of a transport block corresponding to the first transmission reception point and a second quantity of unquantized information bits of a transport block corresponding to the second transmission reception point; and determining a transport block size applicable to the first transmission reception point and the second transmission reception point based at least in part on a sum of the first quantity of unquantized information bits and the second quantity of unquantized information bits.

9. The method of claim 8, wherein a first resource block associated with the first transmission reception point and a second resource block associated with the second transmission reception point comprise a same number of usable time domain resource elements.

10. The method of claim 8, wherein a first transmission layer associated with the first transmission reception point and a second transmission layer associated with the second transmission reception point comprise a same number of usable time domain resource elements.

11. A method for wireless communication at a base station, comprising:

receiving, from a user equipment (UE), an indication of a first guard interval duration for downlink signals from a first transmission reception point and a second guard interval duration for downlink signals from a second transmission reception point; and communicating with the UE via at least the first transmission reception point during a plurality of first symbol periods, each first symbol period of the plurality of first symbol periods comprising a first portion of a first symbol period that includes a first information symbol and a second portion of the first symbol period, after the first portion of the first symbol period, that has the first guard interval duration and includes at least a part of a guard interval sequence.

12. The method of claim 11, further comprising:

communicating with the UE via the second transmission reception point during a plurality of second symbol periods, each second symbol period of the plurality of second symbol periods comprising a first portion of a second symbol period that includes a second information symbol and a second portion of the second symbol period that has the second guard interval duration and includes at least a part of the guard interval sequence.

13. The method of claim 11, wherein the first guard interval duration and the second guard interval duration correspond to a timing difference between signaling from the first transmission reception point to the UE and signaling from the second transmission reception point to the UE.

14. The method of claim 11, wherein receiving the indication of the first guard interval duration and the second guard interval duration comprises:

receiving a first indication identifying a first transmission configuration indicator state, a first transmission configuration indicator state group, a first control resource set pool index, or any combination thereof, associated with the first transmission reception point and the first guard interval duration; and receiving a second indication identifying a second transmission configuration indicator state or a second control resource set pool index, or any combination thereof, associated with the second transmission reception point and the second guard interval duration.

15. The method of claim 11, wherein receiving the indication of the first guard interval duration and the second guard interval duration comprises:

receiving an indication of a same duration for the first guard interval duration and the second guard interval duration, wherein the same duration for the first guard interval duration and the second guard interval duration corresponds to a largest signal delay of a first signal delay for signaling from the first transmission reception point to the UE and a second signal delay for signaling from the second transmission reception point to the UE.

16. The method of claim 15, wherein the communicating with the UE takes place according to a time division multiplexing scheme or using a single frequency network.

17. The method of claim 11, further comprising:

receiving an indication of a time period associated with a capability of the UE to change a guard interval duration; and determining a transport block size for the first transmission reception point according to the time period and based at least in part on the first guard interval duration and the second guard interval duration.

18. The method of claim 11, further comprising:

determining a first quantity of unquantized information bits of a transport block corresponding to the first transmission reception point and a second quantity of unquantized information bits of a transport block corresponding to the second transmission reception point; and determining a transport block size applicable to the first transmission reception point and the second transmission reception point based at least in part on a sum of the first quantity of unquantized information bits and the second quantity of unquantized information bits.

19. The method of claim 18, wherein a first resource block associated with the first transmission reception point and a second resource block associated with the second transmission reception point comprise a same number of usable time domain resource elements.

20. The method of claim 18, wherein a first transmission layer associated with the first transmission reception point and a second transmission layer associated with the second transmission reception point comprise a same number of usable time domain resource elements.

21. An apparatus for wireless communication at a user equipment (UE), comprising:
a processor;
memory coupled with the processor; and
instructions stored in the memory and executable by the processor to cause the apparatus to:
transmit an indication of a first guard interval duration for downlink signals from a first transmission reception point and a second guard interval duration for downlink signals from a second transmission reception point;
communicate with the first transmission reception point during a plurality of first symbol periods, each first symbol period of the plurality of first symbol periods comprising a first portion of a first symbol period that includes a first information symbol and a second portion of the first symbol period, after the first portion of the first symbol period, that has the first guard interval duration and includes at least a part of a guard interval sequence; and
communicate with the second transmission reception point during a plurality of second symbol periods, each second symbol period of the plurality of second symbol periods comprising a first portion of a second symbol period that includes a second information symbol and a second portion of the second symbol period, after the first portion of the first symbol period, that has the second guard interval duration and includes at least a part of the guard interval sequence.

22. The apparatus of claim 21, wherein the instructions are further executable by the processor to cause the apparatus to:
determine the first guard interval duration and the second guard interval duration based at least in part on a timing difference between signaling from the first transmission reception point and signaling from the second transmission reception point, wherein transmitting the indication of the first guard interval duration and the second guard interval duration is based at least in part on the determining.

23. The apparatus of claim 21, wherein the instructions to transmit the indication of the first guard interval duration and the second guard interval duration are executable by the processor to cause the apparatus to:
transmit a first indication identifying a first transmission configuration indicator state, a first transmission configuration indicator state group, a first control resource set pool index, or any combination thereof, associated with the first transmission reception point and the first guard interval duration; and transmit a second indication identifying a second transmission configuration indicator state, a second transmission configuration indicator state group, a second control resource set pool index, or any combination thereof, associated with the second transmission reception point and the second guard interval duration.

24. The apparatus of claim 21, wherein the instructions are further executable by the processor to cause the apparatus to:
perform, within a same time period, a signal processing operation on the first portion of the first symbol period of the plurality of first symbol periods and on the first portion of the second symbol period of the plurality of second symbol periods.

25. The apparatus of claim 21, wherein the instructions are further executable by the processor to cause the apparatus to:
identify a first signal delay for the first transmission reception point and a second signal delay for the second transmission reception point; and
select a same duration for the first guard interval duration and the second guard interval duration based at least in part on a largest signal delay of the first signal delay and the second signal delay, wherein the indication of the first guard interval duration and the second guard interval duration comprises the selected same duration.

26. The apparatus of claim 21, wherein the instructions are further executable by the processor to cause the apparatus to:
transmit an indication of a time period associated with a capability of the UE to change a guard interval duration; and
determine a transport block size for the first transmission reception point, the second transmission reception point, or both, according to the time period and based at least in part on the first guard interval duration and the second guard interval duration.

27. The apparatus of claim 21, wherein the instructions are further executable by the processor to cause the apparatus to:
determine a first quantity of unquantized information bits of a transport block corresponding to the first transmission reception point and a second quantity of unquantized information bits of a transport block corresponding to the second transmission reception point; and
determine a transport block size applicable to the first transmission reception point and the second transmission reception point based at least in part on a sum of the first quantity of unquantized information bits and the second quantity of unquantized information bits.

28. An apparatus for wireless communication at a base station, comprising:
a processor;
memory coupled with the processor; and
instructions stored in the memory and executable by the processor to cause the apparatus to:
receive, from a user equipment (UE), an indication of a first guard interval duration for downlink signals from a first transmission reception point and a second guard interval duration for downlink signals from a second transmission reception point; and
communicate with the UE via at least the first transmission reception point during a plurality of first symbol periods, each first symbol period of the plurality of first symbol periods comprising a first portion of a first symbol period that includes a first information symbol and a second portion of the first symbol period, after the first portion of the first symbol period, that has the first guard interval duration and includes at least a part of a guard interval sequence.

29. The apparatus of claim 28, wherein the instructions are further executable by the processor to cause the apparatus to:

communicate with the UE via the second transmission reception point during a plurality of second symbol periods, each second symbol period of the plurality of second symbol periods comprising a first portion of a second symbol period that includes a second information symbol and a second portion of the second symbol period that has the second guard interval duration and includes at least a part of the guard interval sequence.

30. The apparatus of claim 28, wherein the instructions to receive the indication of the first guard interval duration and the second guard interval duration are executable by the processor to cause the apparatus to:

receive an indication of a same duration for the first guard interval duration and the second guard interval duration, wherein the same duration for the first guard interval duration and the second guard interval duration corresponds to a largest signal delay of a first signal delay for signaling from the first transmission reception point to the UE and a second signal delay for signaling from the second transmission reception point to the UE.

* * * * *